United States Patent
Hoshuyama et al.

(10) Patent No.: US 11,231,495 B2
(45) Date of Patent: *Jan. 25, 2022

(54) SIGNAL PROCESSING DEVICE AND SIGNAL PROCESSING METHOD

(71) Applicant: NEC Corporation, Tokyo (JP)

(72) Inventors: Osamu Hoshuyama, Tokyo (JP); Kentarou Kudou, Tokyo (JP); Shohei Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 16/494,811

(22) PCT Filed: Mar. 23, 2018

(86) PCT No.: PCT/JP2018/011765
§ 371 (c)(1),
(2) Date: Sep. 17, 2019

(87) PCT Pub. No.: WO2018/181018
PCT Pub. Date: Oct. 4, 2018

(65) Prior Publication Data
US 2020/0081109 A1  Mar. 12, 2020

(30) Foreign Application Priority Data
Mar. 30, 2017  (JP) .............................. JP2017-068243

(51) Int. Cl.
*G01S 13/536* (2006.01)
*G01S 7/35* (2006.01)
*G01S 7/04* (2006.01)

(52) U.S. Cl.
CPC ............ *G01S 13/536* (2013.01); *G01S 7/354* (2013.01); *G01S 7/04* (2013.01)

(58) Field of Classification Search
CPC .......... G01S 13/536; G01S 15/50; G01S 7/04; G01S 7/354; G01S 7/526; G01S 13/52; G01S 13/584; G01S 7/35
See application file for complete search history.

(56) References Cited

U.S. PATENT DOCUMENTS

| | | |
|---|---|---|
| 3,225,349 A | 12/1965 | Thor |
| 5,422,646 A | 6/1995 | Lewis |

(Continued)

FOREIGN PATENT DOCUMENTS

| | | |
|---|---|---|
| JP | H08-179037 A | 7/1996 |
| JP | 2000-187068 A | 7/2000 |

(Continued)

OTHER PUBLICATIONS

International Search Report in International Application No. PCT/JP2018/011765, dated Jun. 26, 2018.

(Continued)

*Primary Examiner* — Timothy X Pham
(74) *Attorney, Agent, or Firm* — Sughrue Mion, PLLC

(57) ABSTRACT

In order to achieve object detection that does not detect an object moving at a speed within a prescribed speed range, the present invention comprises at least two cross-correlation calculation units which each calculate a cross correlation function between a waveform of a reflection signal obtained when a transmission signal having changing frequencies is reflected by a target object, and a different correlation waveform generated from the waveform of the transmission signal, and a synthesis unit that synthesizes at least two cross-correlation functions from at least the two cross-correlation calculation units so as to make detection of a target object moving at a speed within the prescribed speed range less likely, and that outputs the synthesis results to a post-processing unit.

11 Claims, 41 Drawing Sheets

(56) References Cited

U.S. PATENT DOCUMENTS

| | | | | |
|---|---|---|---|---|
| 2006/0220949 | A1* | 10/2006 | Nohmi | G01S 13/343 342/160 |
| 2015/0016224 | A1* | 1/2015 | Houshuyama | G01S 7/52 367/93 |
| 2015/0247924 | A1* | 9/2015 | Kishigami | G01S 7/411 342/70 |
| 2015/0355322 | A1* | 12/2015 | Oshima | G01S 13/46 342/116 |
| 2018/0231652 | A1* | 8/2018 | Rao | G01S 7/415 |
| 2020/0081111 | A1* | 3/2020 | Hoshuyama | G01S 13/584 |

FOREIGN PATENT DOCUMENTS

| | | | |
|---|---|---|---|
| JP | 2002-131423 | A | 5/2002 |
| JP | 2015-017942 | A | 1/2015 |
| JP | 2015-172510 | A | 10/2015 |
| JP | 2016-50789 | A | 4/2016 |
| WO | 2013/128878 | A1 | 9/2013 |

OTHER PUBLICATIONS

Written Opinion in International Application No. PCT/JP2018/011765, dated Jun. 26, 2018.

Yasunari Yokota, "Signal Processing, Part 3 Non-Stationary Signal Analysis, Cepstrum Analysis", Lecture Material, May 22, 2003, [online] URL:https://www1.gifu-u.ac.jp/~yktlab/sp3.pdf, pp. 1-44 (45 pages total).

Yuji Sato et al., "Multichannelizing of Pulse Compression in Ultrasonic Distance Measurement Using M-Sequence Coding", Meeting Reports of the Acoustical Society of Japan, Sep. 2008, pp. 1527-1528 (2 pages total).

Osamu Hoshuyama et al., "Doppler Robust Radar Based on Correlation Synthesis Operation" Communication Lecture Proceedings 1 of the 2017 IEICE General Conference, Mar. 7, 2017, p. 194 (1 page total).

Japanese Office Action for JP Application No. 2019-509718 dated Aug. 31, 2021 with English Translation.

* cited by examiner

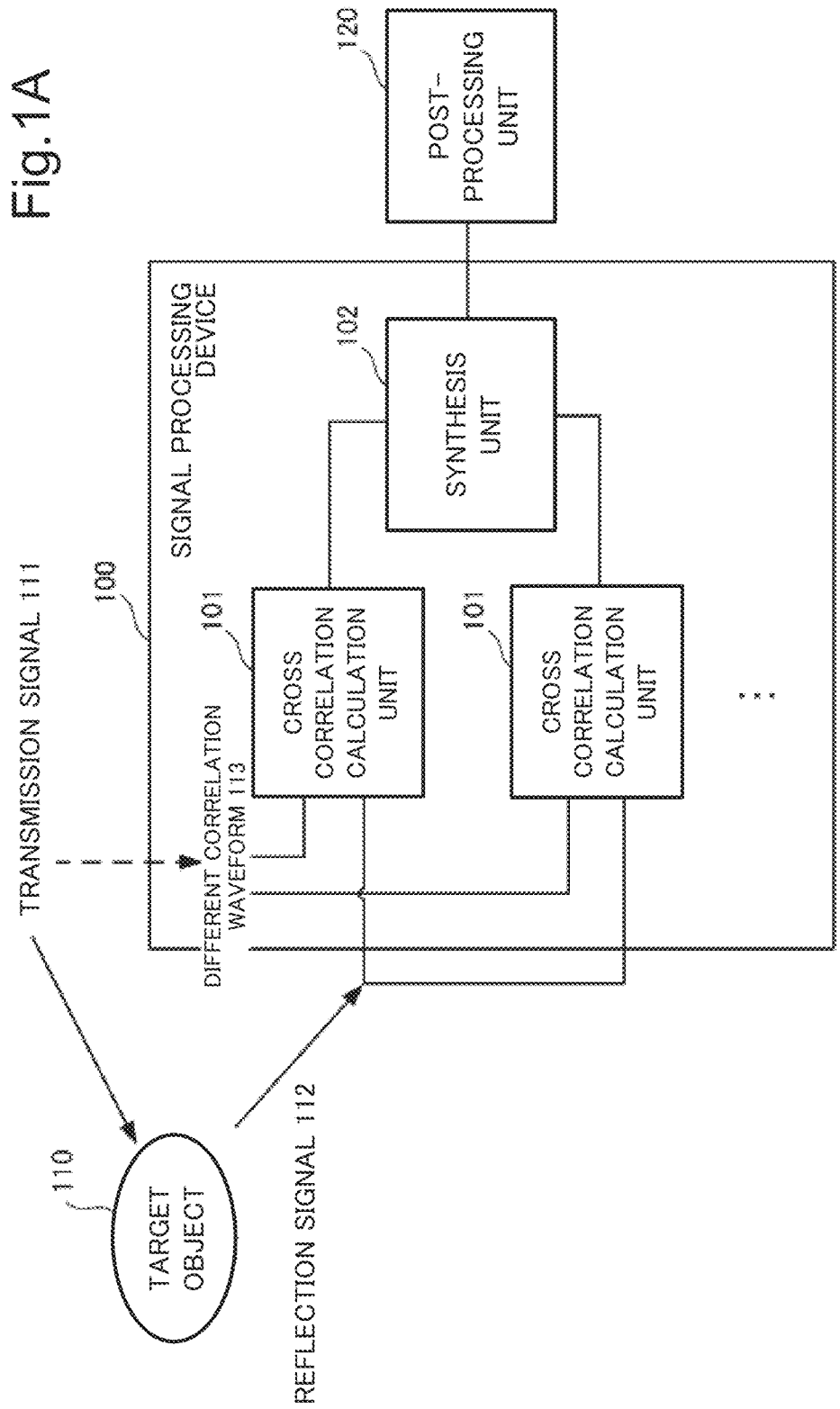

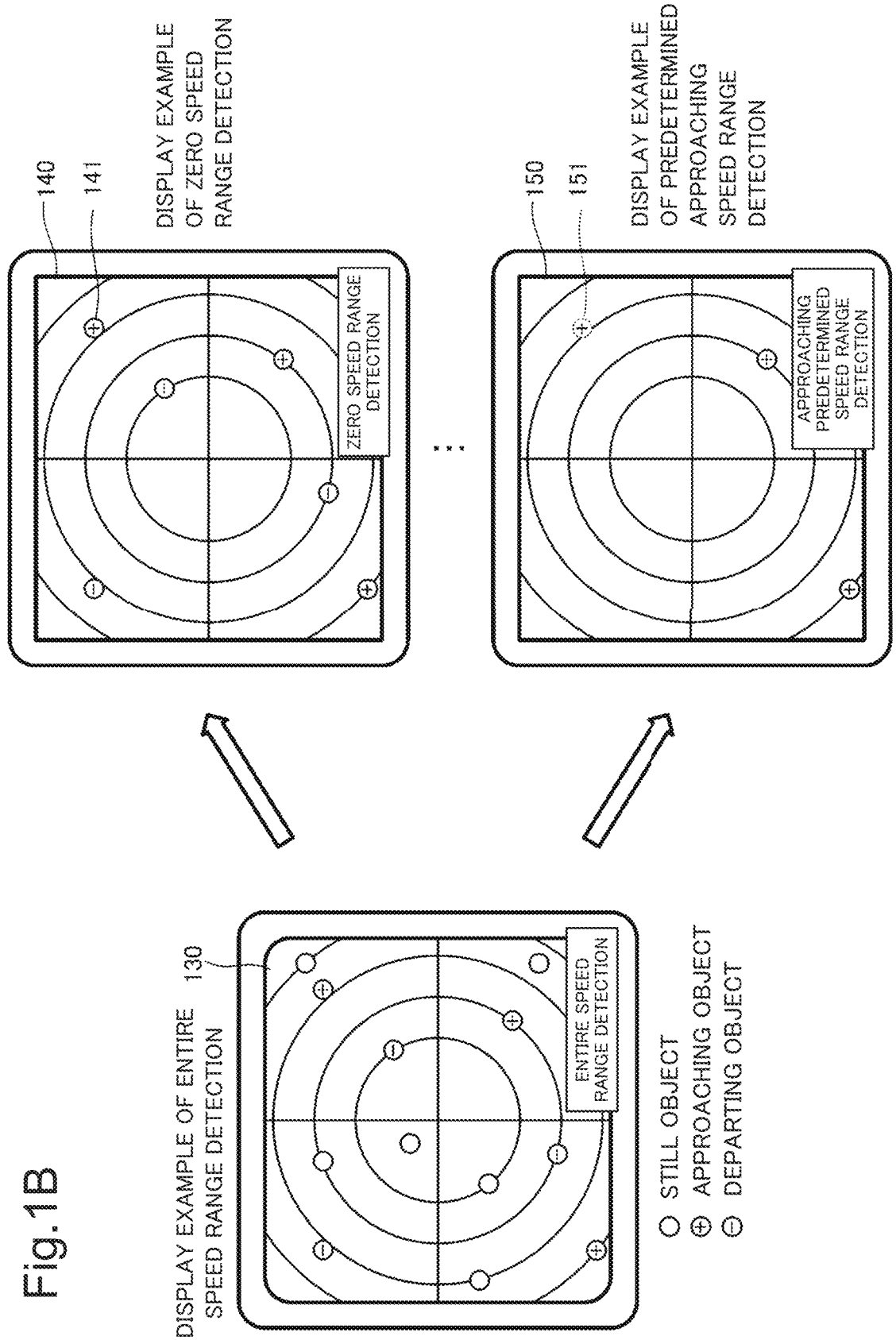

Fig.2
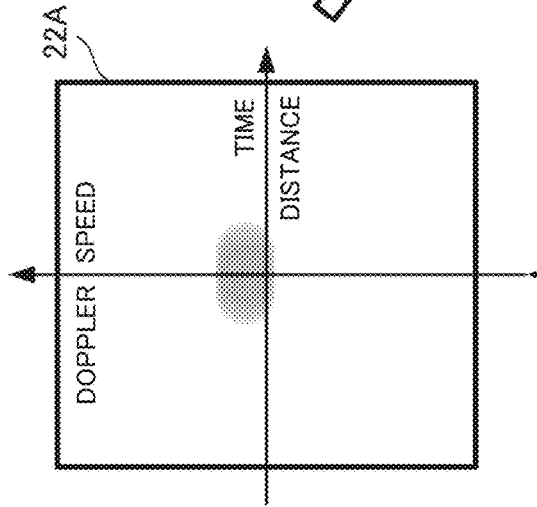
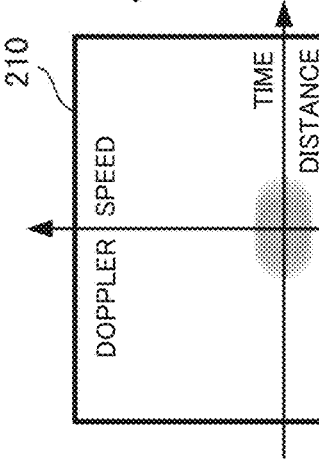

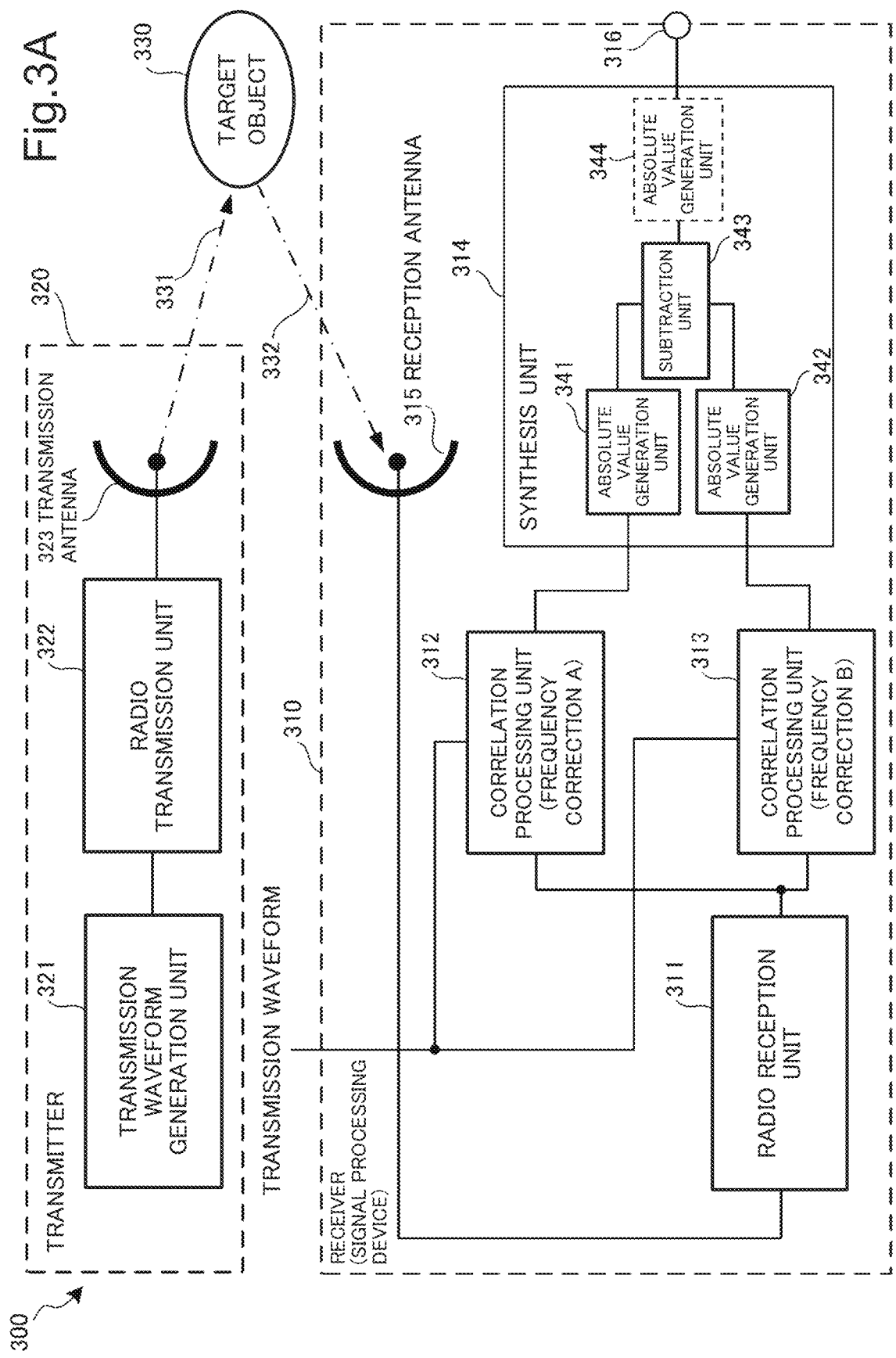

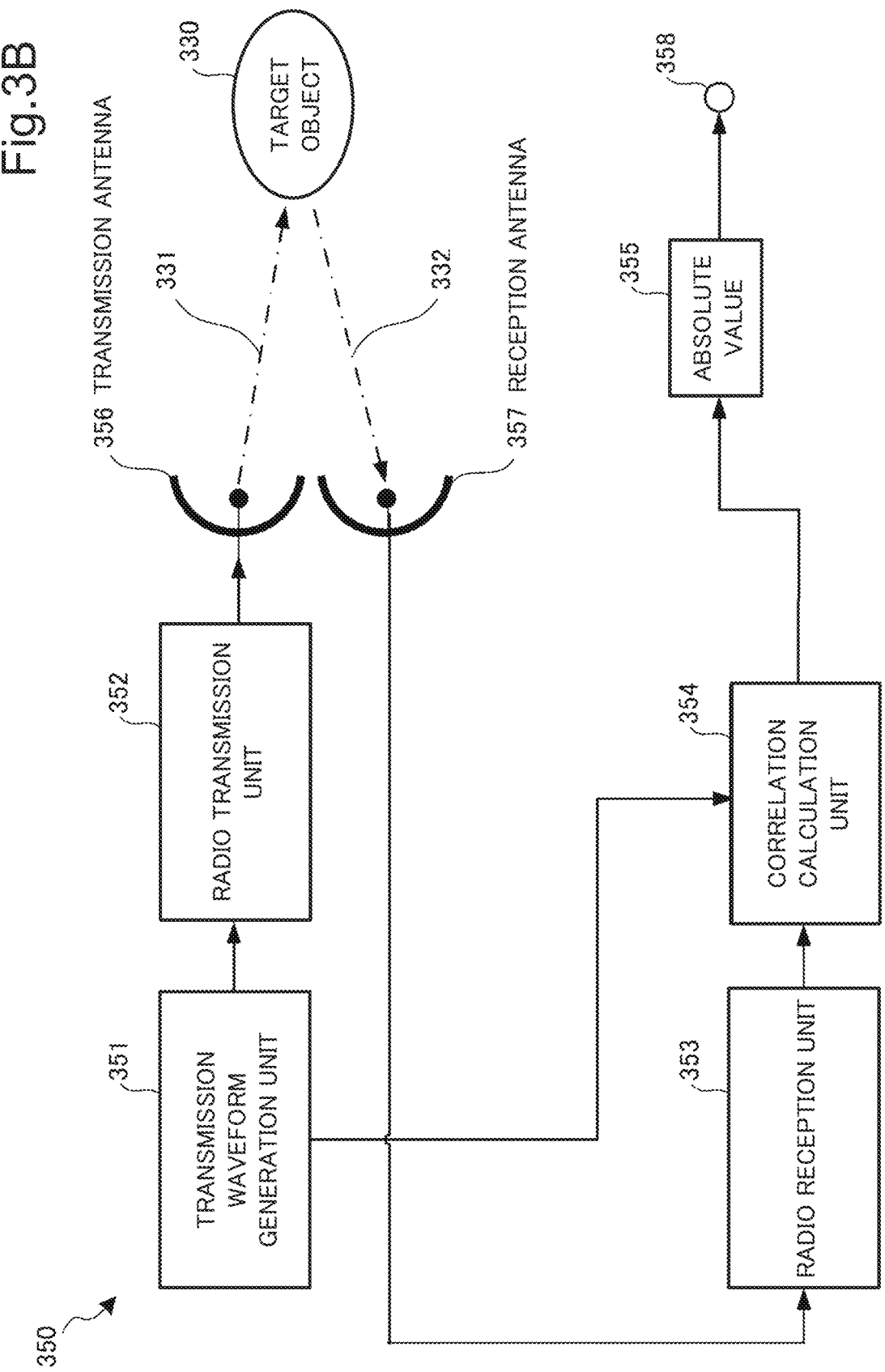

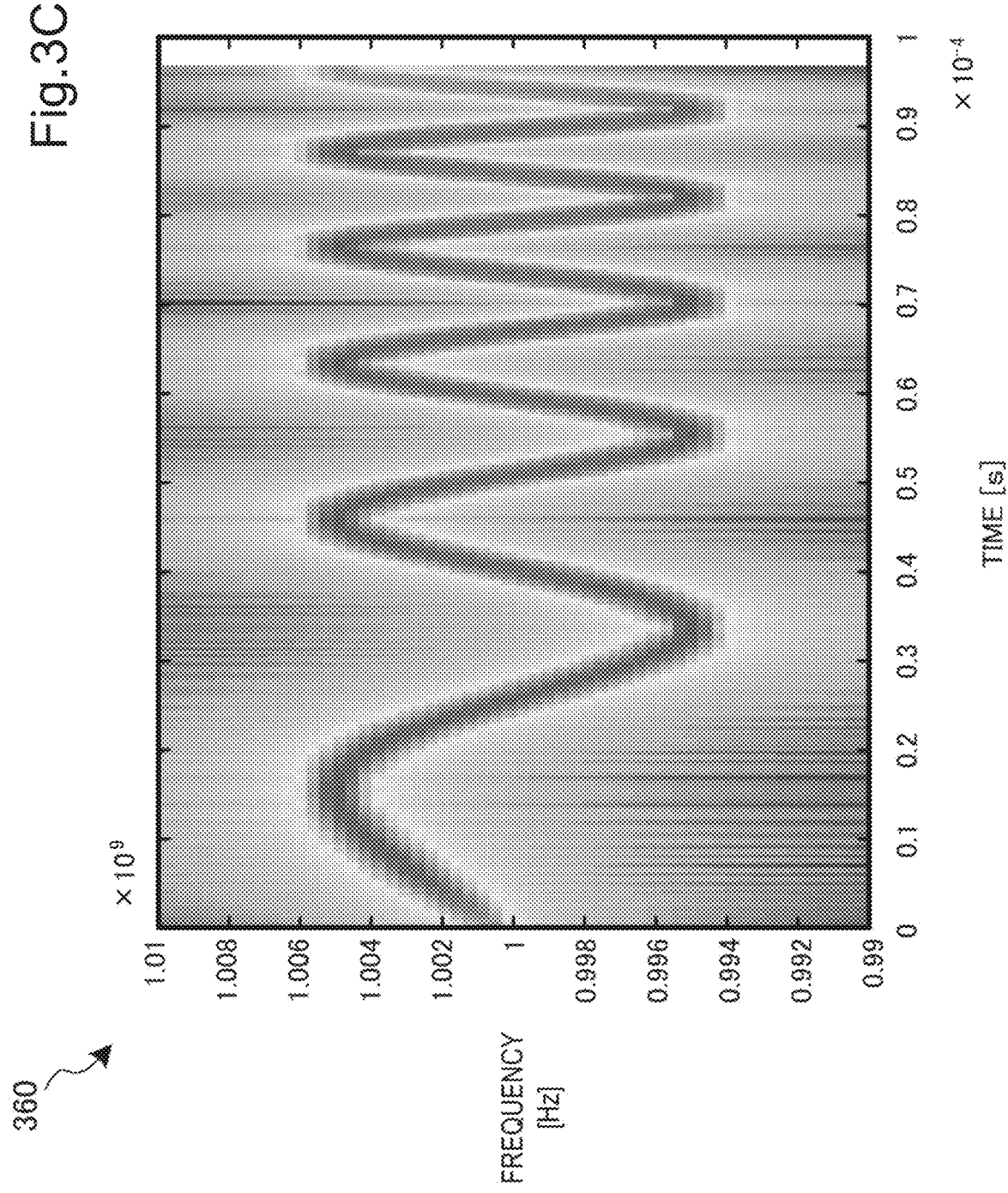

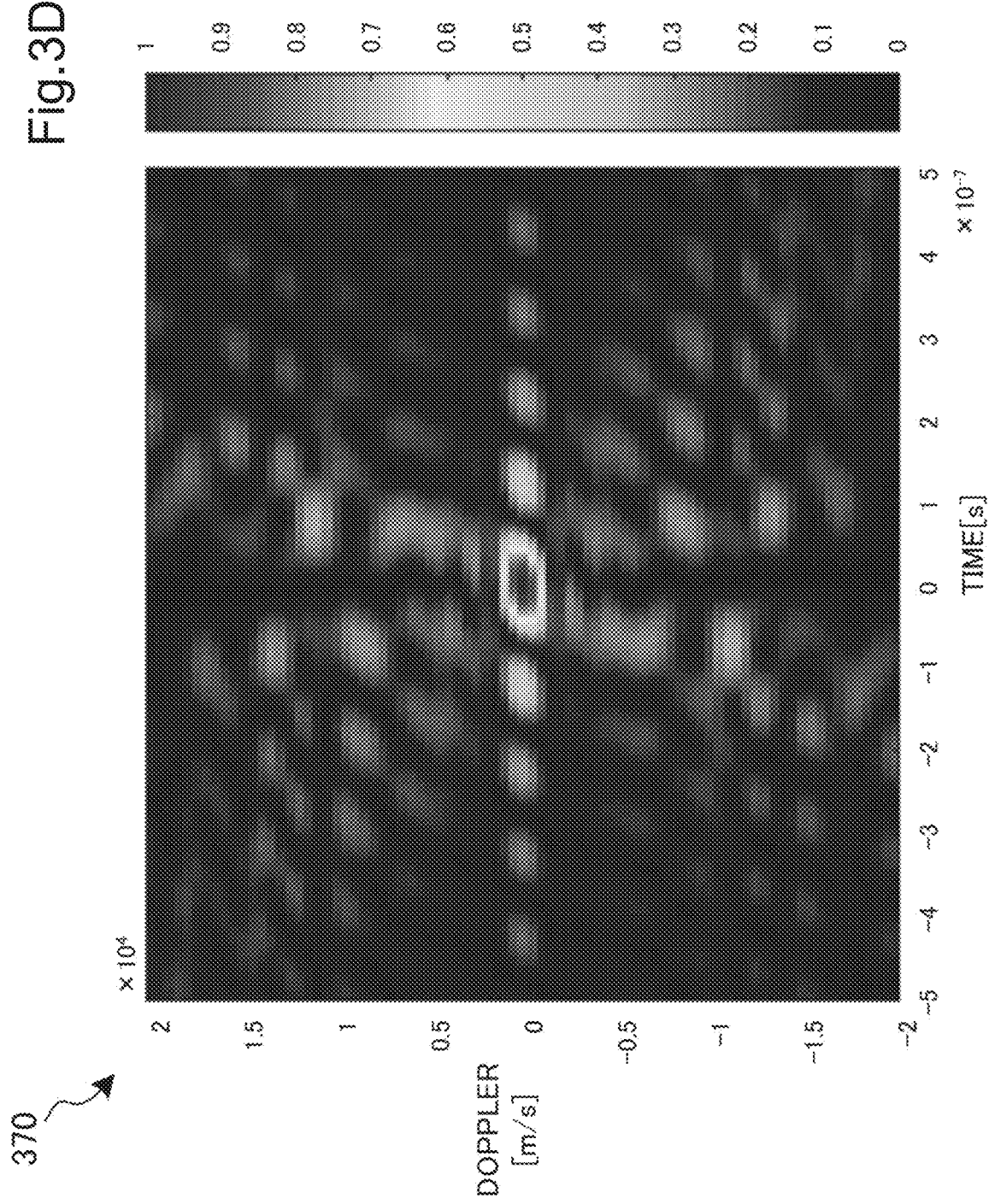

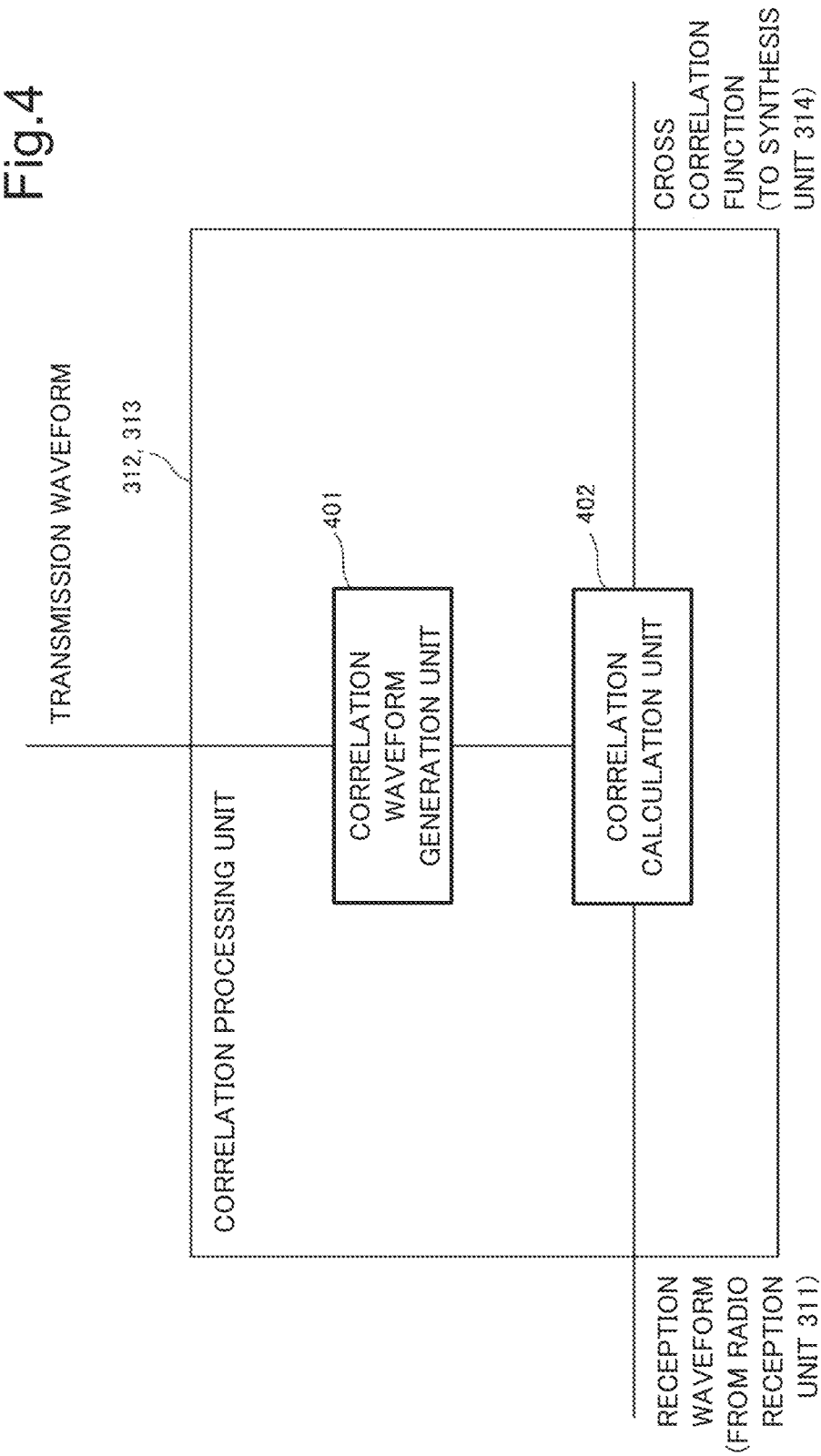

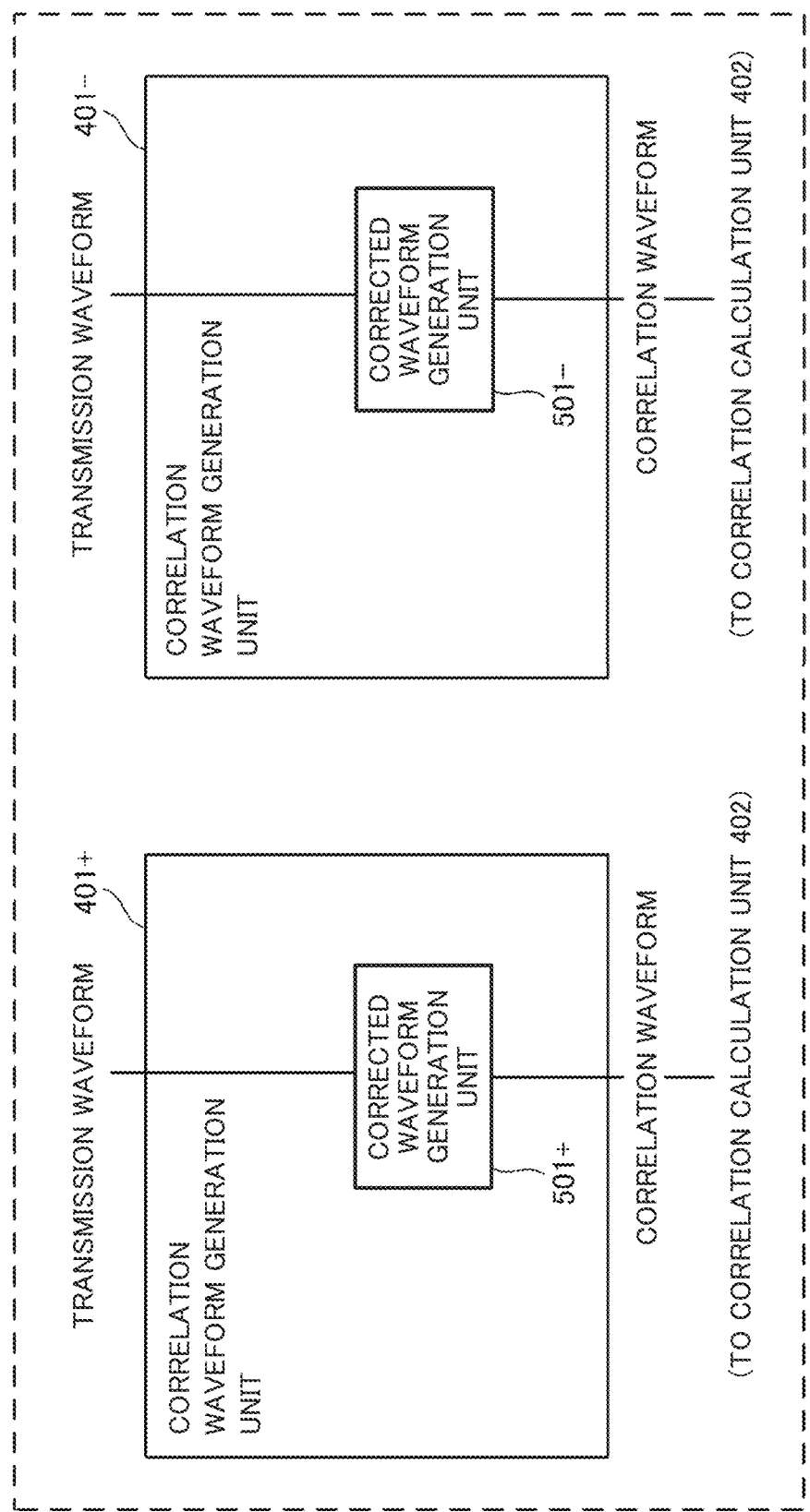

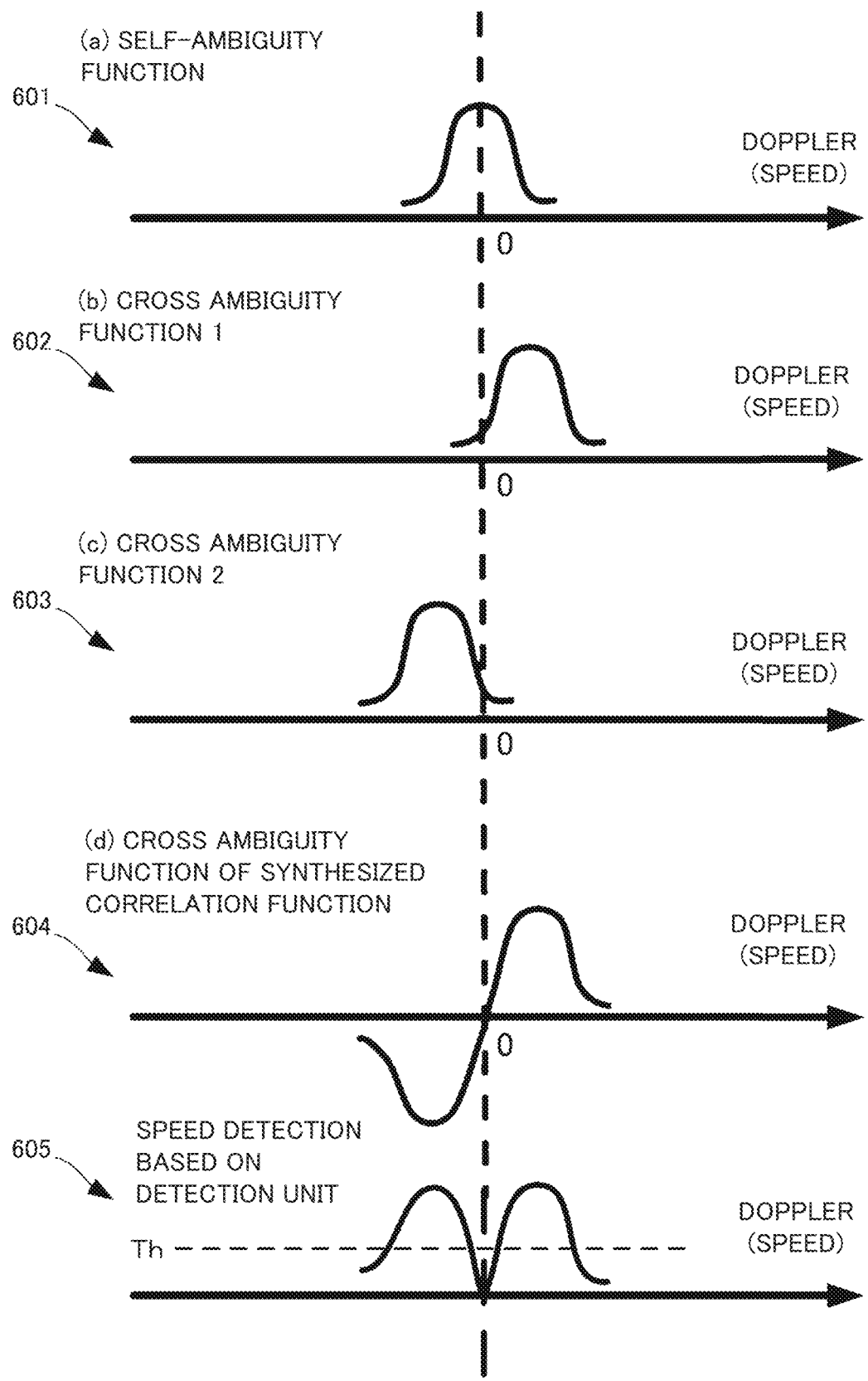

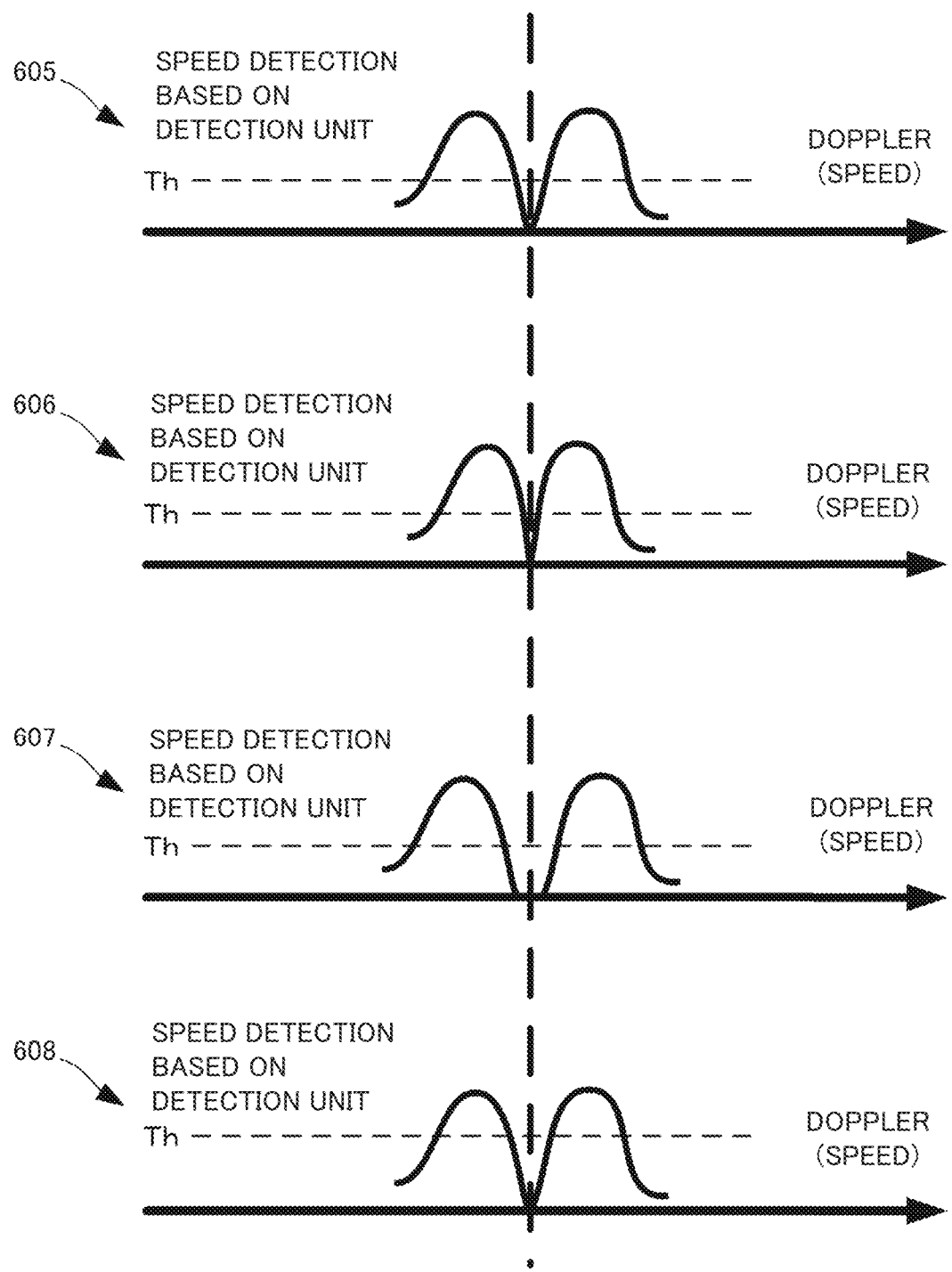

Fig.14

| TRANSMISSION WAVEFORM | CORRELATION WAVEFORM A PLUS (+)-CORRECTED WAVEFORM | CORRELATION WAVEFORM B MINUS (−)-CORRECTED WAVEFORM |
|---|---|---|
| BM-SFM (CYCLE a) | | |
| BM-SFM (CYCLE b) | +0.0005% | −0.0005% |
| TASFM (CYCLE c) | +0.00025% | −0.00025% |
| ... | | |

Fig.16

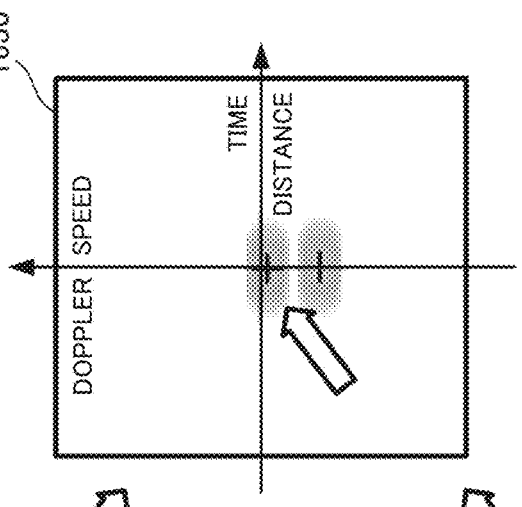
(d) AMBIGUITY FUNCTION OF SYNTHESIZED CORRELATION FUNCTION

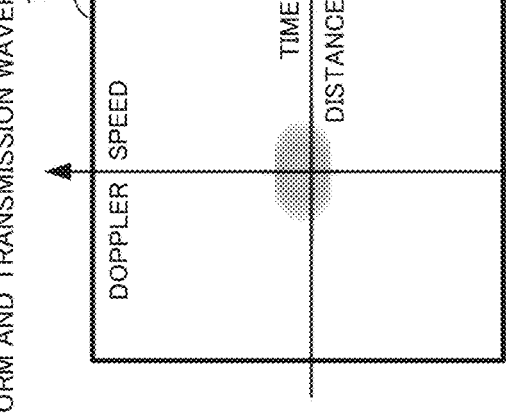
(b) CROSS AMBIGUITY FUNCTION C BETWEEN CORRELATION WAVEFORM AND TRANSMISSION WAVEFORM (c) CROSS AMBIGUITY FUNCTION D BETWEEN CORRELATION WAVEFORM AND TRANSMISSION WAVEFORM

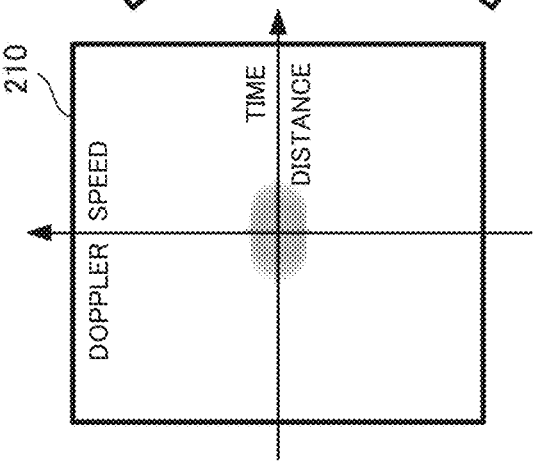
(a) SELF-AMBIGUITY FUNCTION OF TRANSMISSION WAVEFORM: SYMMETRICAL WITH RESPECT TO DOPPLER DIRECTION

SYMMETRICAL WITH RESPECT TO TIME AXIS SHIFTED IN DOPPLER DIRECTION

WHEN SUBTRACTION IS EXECUTED BY USING ABSOLUTE VALUES, GAP IS GENERATED IN CENTER

Fig.17

| TRANSMISSION WAVEFORM | CORRELATION WAVEFORM C PLUS (+) CORRECTED WAVEFORM | CORRELATION WAVEFORM D MINUS (−) CORRECTED WAVEFORM |
|---|---|---|
| BM-SFM (CYCLE a) | | |
| BM-SFM (CYCLE b) | | |
| TASFM (CYCLE c) | +0.00015% | −0.00035% |
| ... | | |

1401 — 1702 — 1703

1752

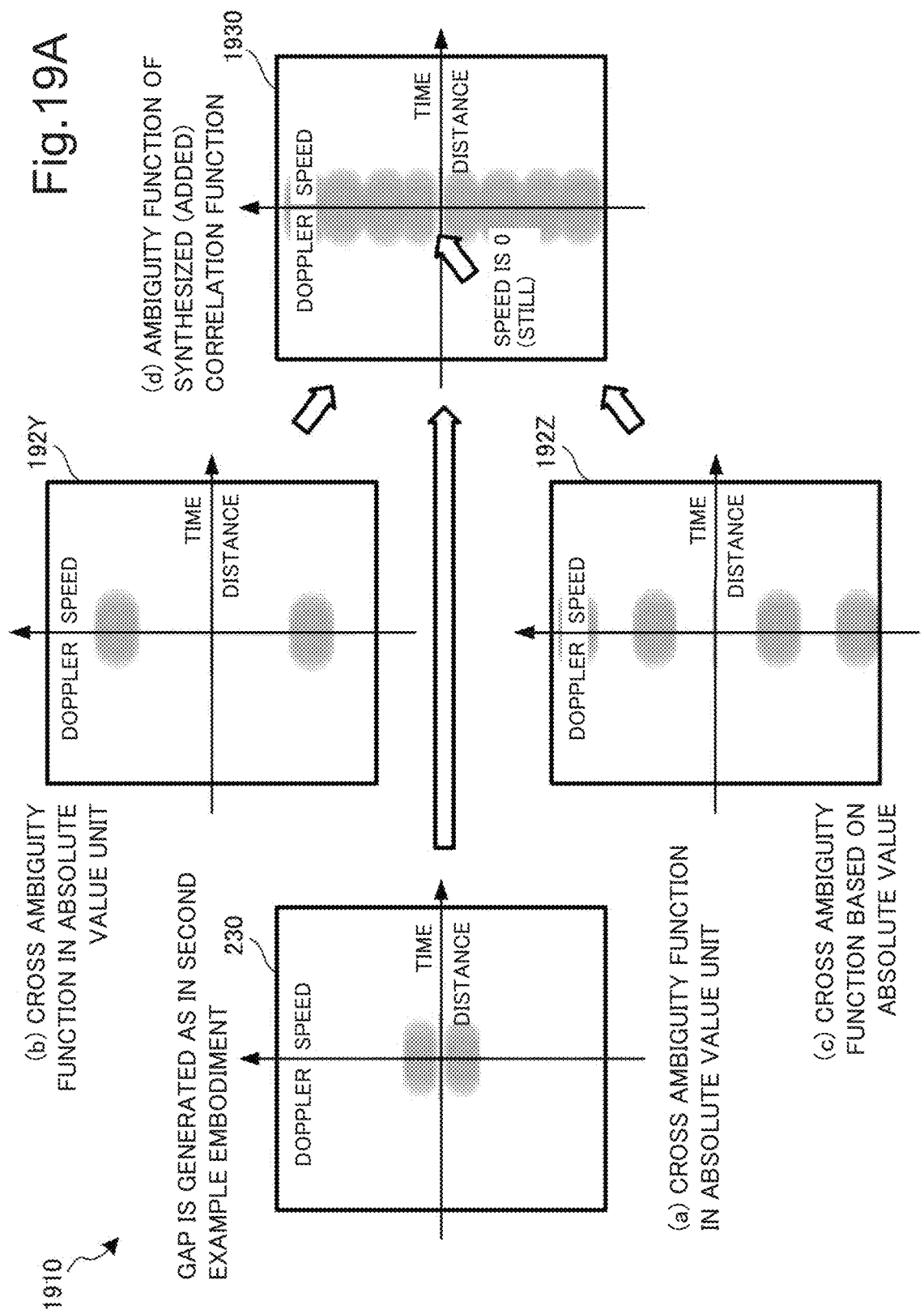

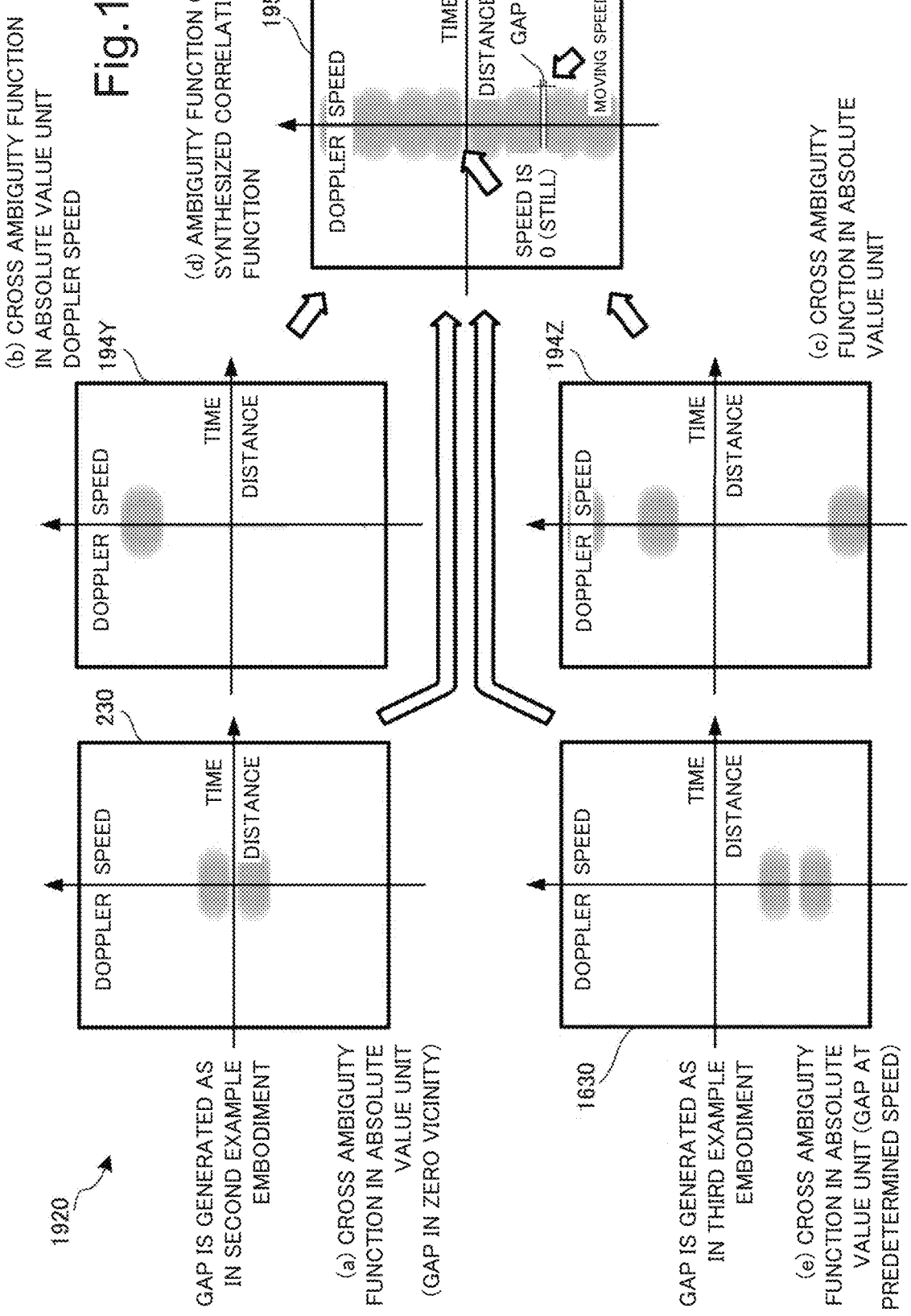

Fig.22

```
TRANSMISSION WAVEFORM →  CORRELATION WAVEFORM GENERATION UNIT 2101
                         ├──→ CORRECTED WAVEFORM GENERATION UNIT 2201₁ ──→ ADDITION UNIT 2202 ──→ CORRELATION WAVEFORM
                         ├──→ CORRECTED WAVEFORM GENERATION UNIT 2201₂ ──→                        (TO CORRELATION CALCULATION UNIT 402)
                         ⋮
                         └──→ CORRECTED WAVEFORM GENERATION UNIT 2201_N ──→
```

| TRANSMISSION WAVEFORM | CORRELATION WAVEFORM A<br>PLUS (+) CORRECTED WAVEFORM | CORRELATION WAVEFORM B<br>MINUS (−) CORRECTED WAVEFORM | CORRELATION WAVEFORM X | | CORRELATION WAVEFORM Y | |
|---|---|---|---|---|---|---|
| | | | jTH CORRECTED WAVEFORM | ... | ADDED WAVEFORM X | jTH CORRECTED WAVEFORM | ... | ADDED WAVEFORM Y |
| BM-SFM (CYCLE a) | +0.0005% | −0.0005% | | | | |
| BM-SFM (CYCLE b) | +0.00025% | −0.00025% | | | | |
| TASFM (CYCLE c) | | | | | | |
| ... | | | | | | |

1401  1402  1403  2304  2305

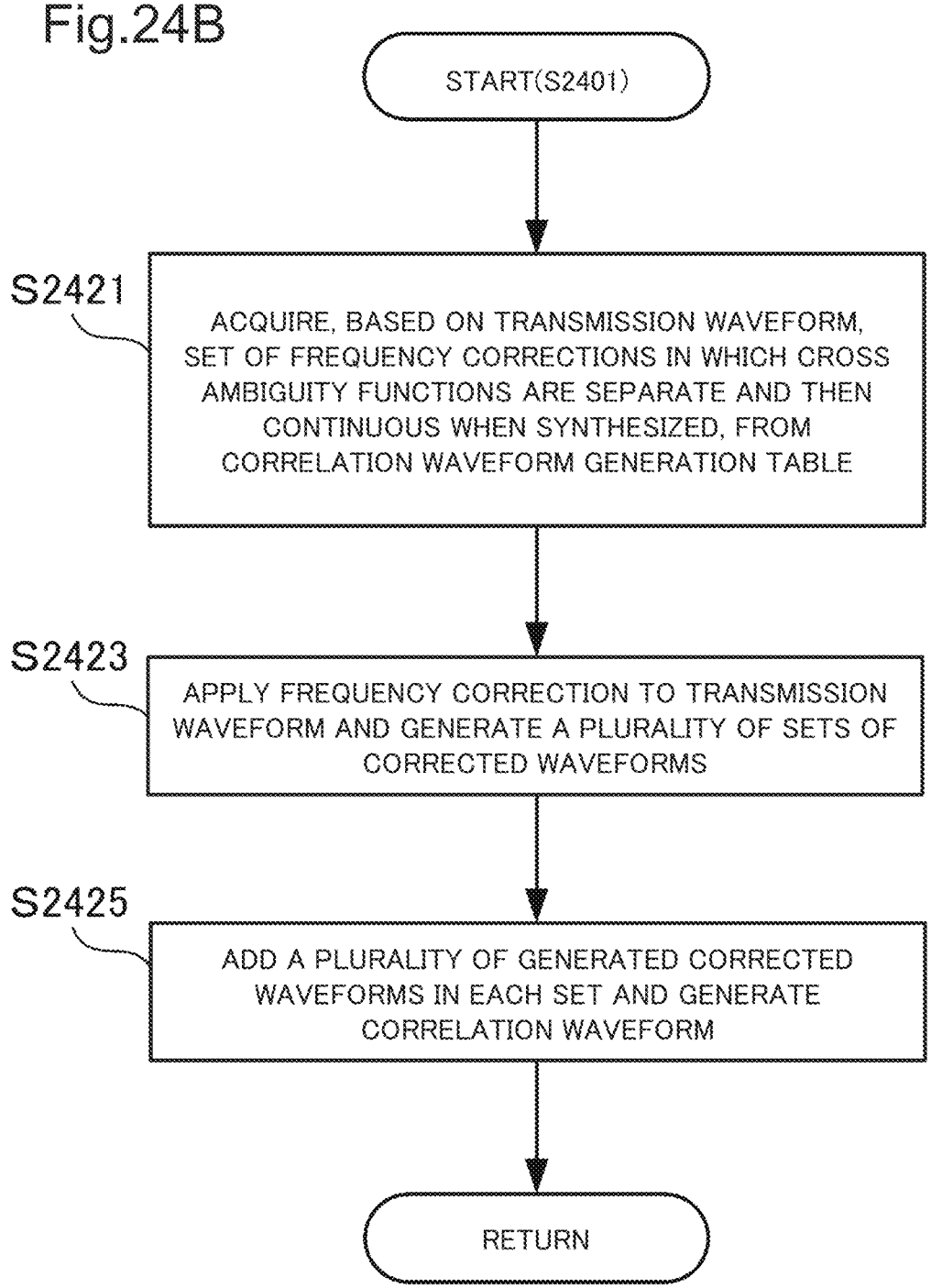

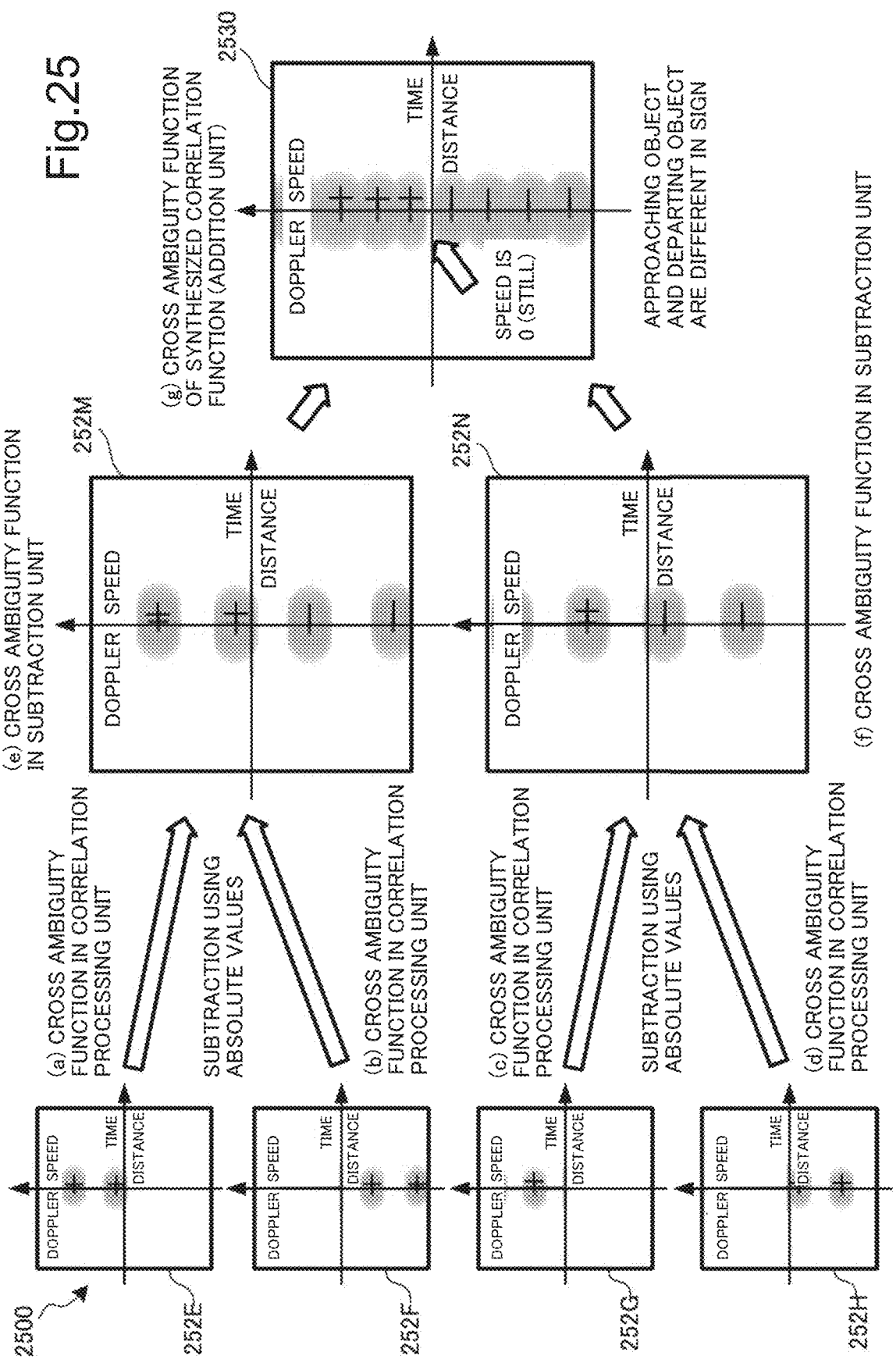

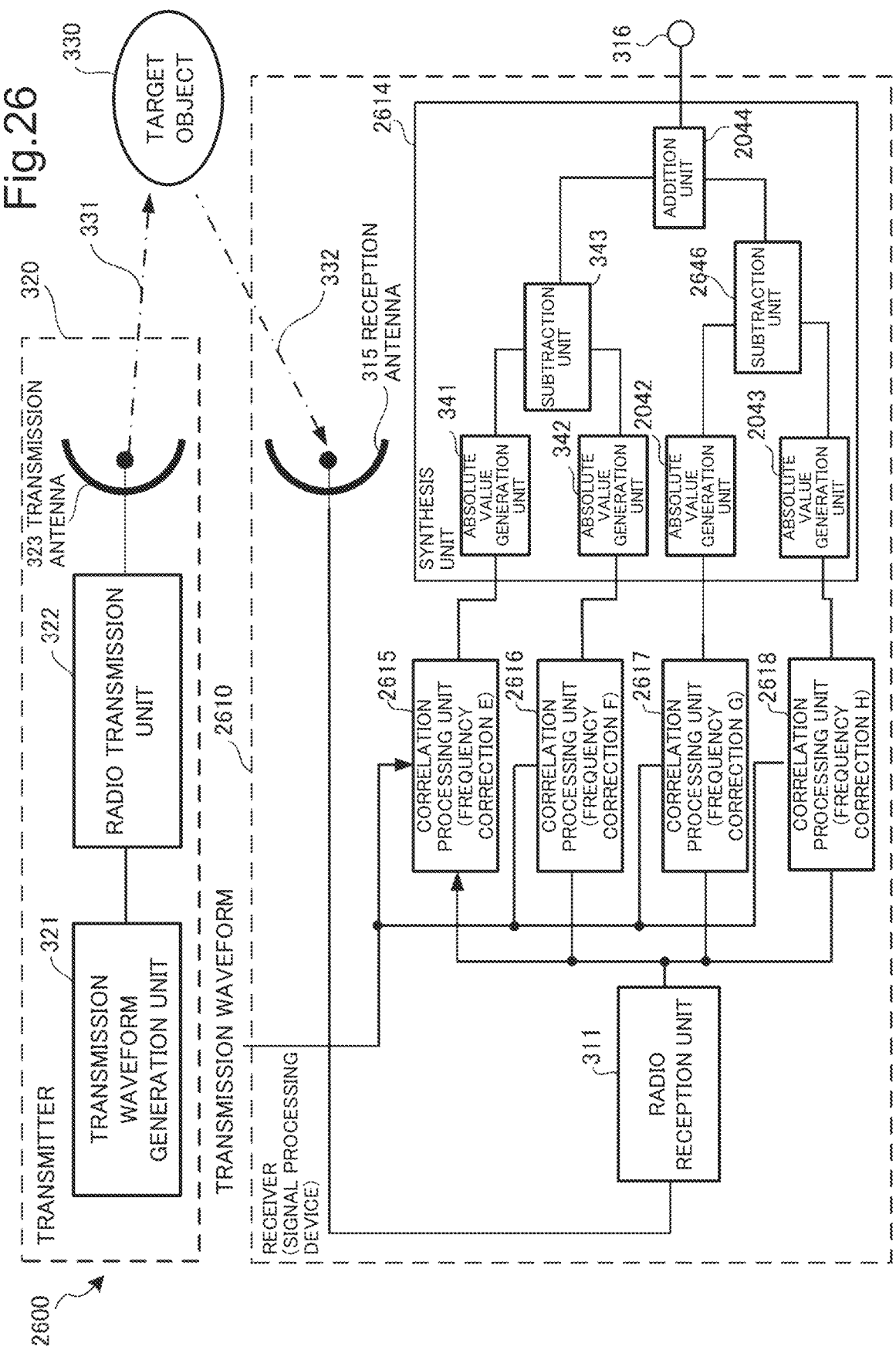

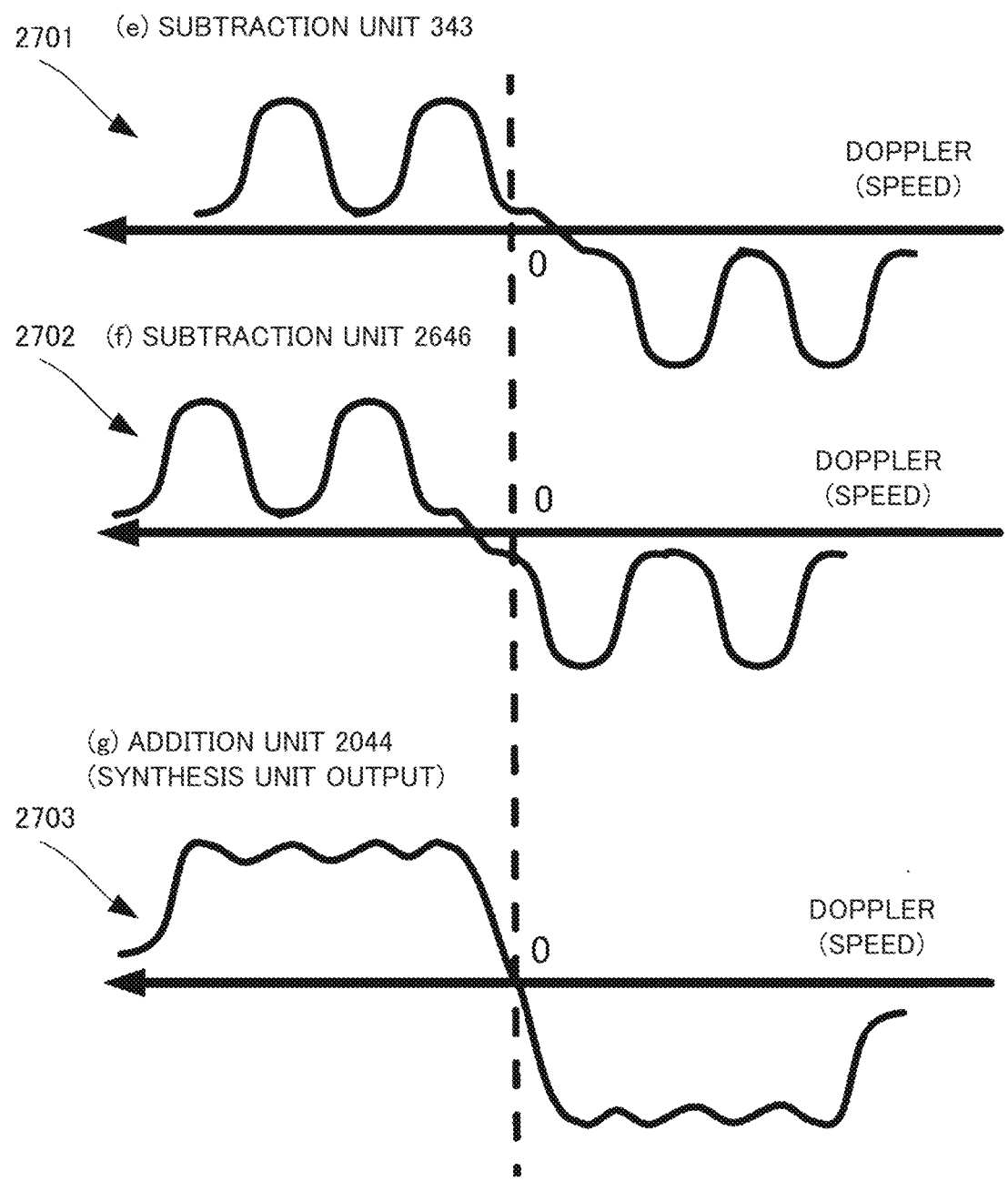

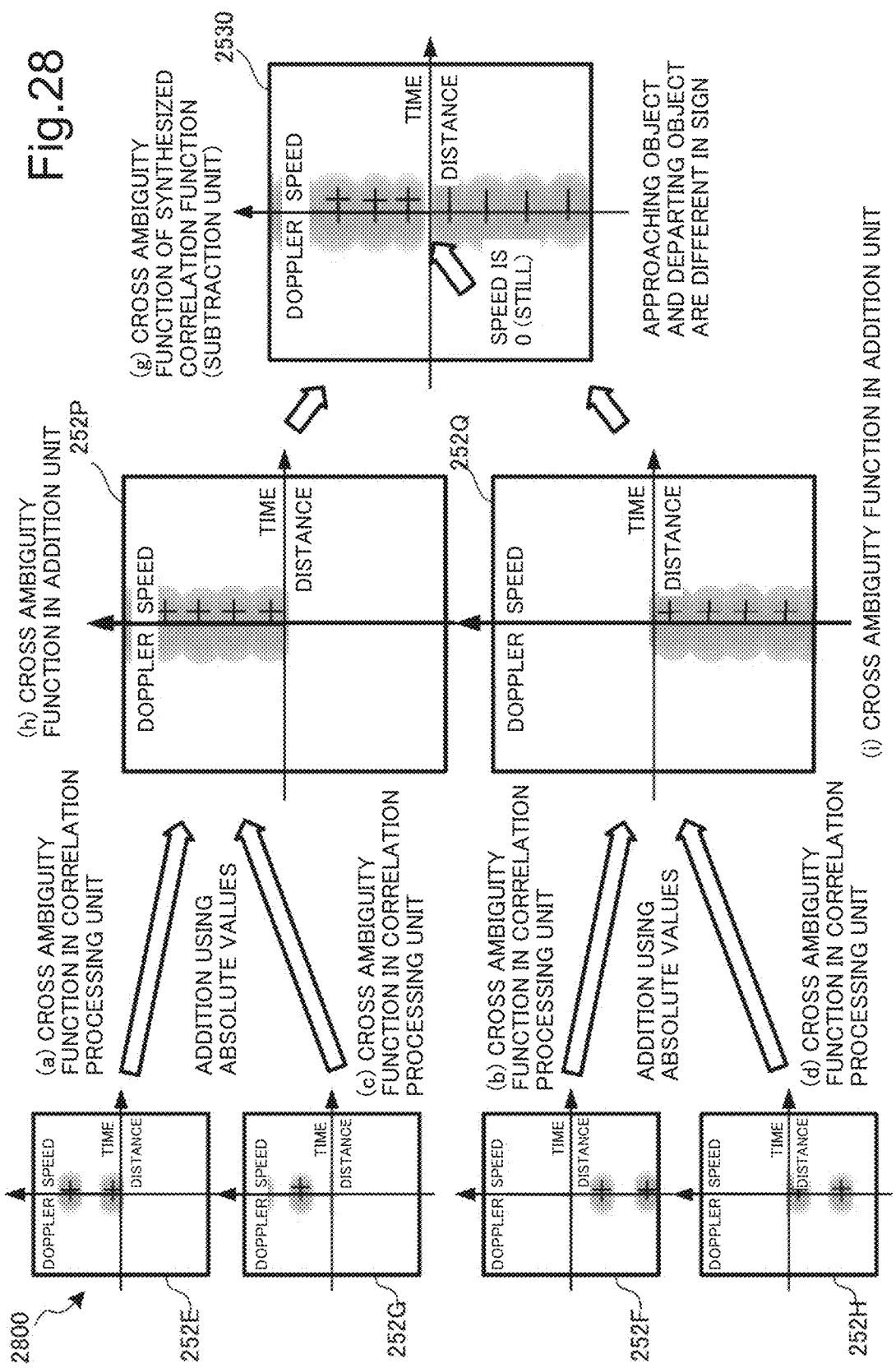

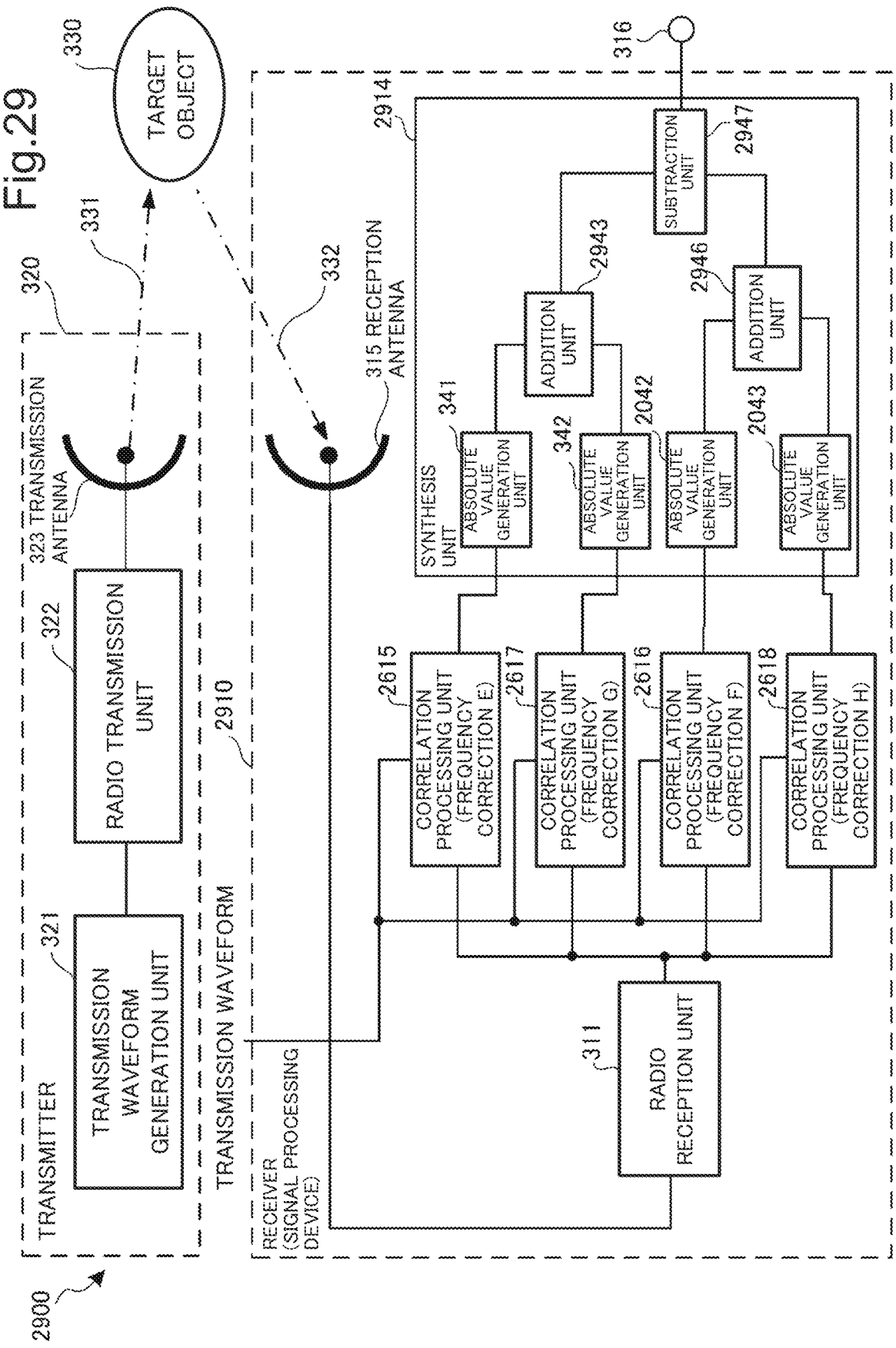

SIGNAL PROCESSING DEVICE AND SIGNAL PROCESSING METHOD

This application is a National Stage Entry of PCT/JP2018/011765 filed on Mar. 23, 2018, which claims priority from Japanese Patent Application 2017-068243 filed on Mar. 30, 2017, the contents of all of which are incorporated herein by reference, in their entirety.

TECHNICAL FIELD

The present invention relates to a signal processing device and a signal processing method.

BACKGROUND ART

In the technical field described above, NPL 1 discloses a technique of transmitting, in order to measure a distance to a target object, a radio wave, receiving a radio wave reflected from the target object, and measuring a distance, based on a cross correlation function between a waveform of the received radio wave and a waveform of the transmitted radio wave. PTL 1 discloses a technique of using a waveform (so-called accelerated sinusoidal frequency modulation (ASFM) waveform) in which a sinusoidal wave based on frequency modulation of an SFM waveform as a transmission waveform of a sound signal is modulated, and detecting at least any one of a distance to a target object or a moving speed.

CITATION LIST

Patent Literature

[PTL 1] International Publication No. WO 2013/128878

Non Patent Literature

[NPL 1] Yuji Sato, Shinnosuke Hirata, Minoru Kurosawa, and So Katagiri, "Multichannelizing of Pulse Compression in Ultrasonic Distance Measurement Using M-Sequence Coding" Meeting Reports of the Acoustical Society of Japan, September 2008, pp. 1527 to 1528

[NPL 2] Yasunari Yokota, lecture material, "Signal Processing, Part 3 Non-Stationary Signal Analysis, Cepstrum Analysis", [online] May 22, 2003, [retrieved on Jan. 26, 2017], the Internet <URL:https://www1.gifu-u.ac.jp/~yktlab/sp3.pdf>

SUMMARY OF INVENTION

Technical Problem

However, in the techniques described in the above-described documents, all objects having a speed equal to or smaller than a certain speed including a still object are detected. It has been difficult for the techniques to cope with a case where it is not desirable to detect a still object.

An object of the present invention is to provide a technique for solving the problem described above.

Solution to Problem

In order to achieve the above-described object, a signal processing device according to the present invention includes:

at least two cross correlation calculation means that each calculate a cross correlation function between a waveform of a reflection signal acquired when a transmission signal having changing frequencies is reflected by a target object and a different correlation waveform generated from a waveform of the transmission signal; and a synthesis means that synthesizes at least two cross correlation functions acquired from the at least two cross correlation calculation means in such a way that it is difficult to detect a target object in a predetermined speed range, and outputs a synthesis result to a post-processing unit.

In order to achieve the above-described object, a signal processing method according to the present invention includes:

calculating at least two cross correlation functions each between a waveform of a reflection signal acquired when a transmission signal having changing frequencies is reflected by a target object and a different correlation waveform generated from a waveform of the transmission signal;

synthesizing the calculated at least two cross correlation functions in such a way that it is difficult to detect a target object in a predetermined speed range, and outputting a synthesis result to a post-processing unit.

Advantageous Effects of Invention

The present invention is able to achieve object detection that does not detect an object in a predetermined speed range.

BRIEF DESCRIPTION OF DRAWINGS

FIG. 1A is a block diagram illustrating a configuration of a signal processing device according to a first example embodiment of the present invention.

FIG. 1B is a display example of an object detection result according to an example embodiment of the present invention.

FIG. 2 is a diagram illustrating a processing outline of a signal processing device according to a second example embodiment of the present invention.

FIG. 3A is a block diagram illustrating a functional configuration of the signal processing device according to the second example embodiment of the present invention.

FIG. 3B is a block diagram illustrating a configuration of a signal processing device according to a prior art.

FIG. 3C is a diagram illustrating a spectrogram of a transmission waveform in a prior art.

FIG. 3D is a diagram illustrating a self-ambiguity function in a prior art.

FIG. 4 is a block diagram illustrating a functional configuration of a correlation processing unit according to the second example embodiment of the present invention.

FIG. 5 is a block diagram illustrating a functional configuration of a correlation waveform generation unit according to the second example embodiment of the present invention.

FIG. 6A is a diagram illustrating synthesis processing of a synthesis unit in which a central portion of an ambiguity function according to the second example embodiment of the present invention is viewed as a cross-section.

FIG. 6B is a diagram illustrating synthesis processing of a synthesis unit in which a detection range of a central portion of an ambiguity function according to the second example embodiment of the present invention is viewed as a cross-section.

FIG. 14 is a diagram illustrating a configuration of a correlation waveform generation table according to the second example embodiment of the present invention.

FIG. 17 is a diagram illustrating a configuration of a correlation waveform generation table according to the third example embodiment of the present invention.

FIG. 19A is a diagram illustrating a processing outline of a signal processing device according to a fourth example embodiment of the present invention.

FIG. 19B is a diagram illustrating another processing outline of the signal processing device according to the fourth example embodiment of the present invention.

FIG. 22 is a block diagram illustrating a functional configuration of a correlation waveform generation unit according to the fourth example embodiment of the present invention.

FIG. 23 is a diagram illustrating a configuration of a correlation waveform generation table according to the fourth example embodiment of the present invention.

FIG. 24B is a flowchart illustrating a procedure of correlation waveform generation processing according to the fourth example embodiment of the present invention.

FIG. 25 is a diagram illustrating a processing outline of a signal processing device according to a fifth example embodiment of the present invention.

FIG. 26 is a block diagram illustrating a functional configuration of the signal processing device according to the fifth example embodiment of the present invention.

FIG. 27 is a diagram illustrating synthesis processing in which a central portion of an ambiguity function according to the fifth example embodiment of the present invention is viewed as a cross-section.

FIG. 28 is a diagram illustrating a processing outline of a signal processing device according to a sixth example embodiment of the present invention.

FIG. 29 is a block diagram illustrating a functional configuration of the signal processing device according to the sixth example embodiment of the present invention.

EXAMPLE EMBODIMENT

Figure 7:
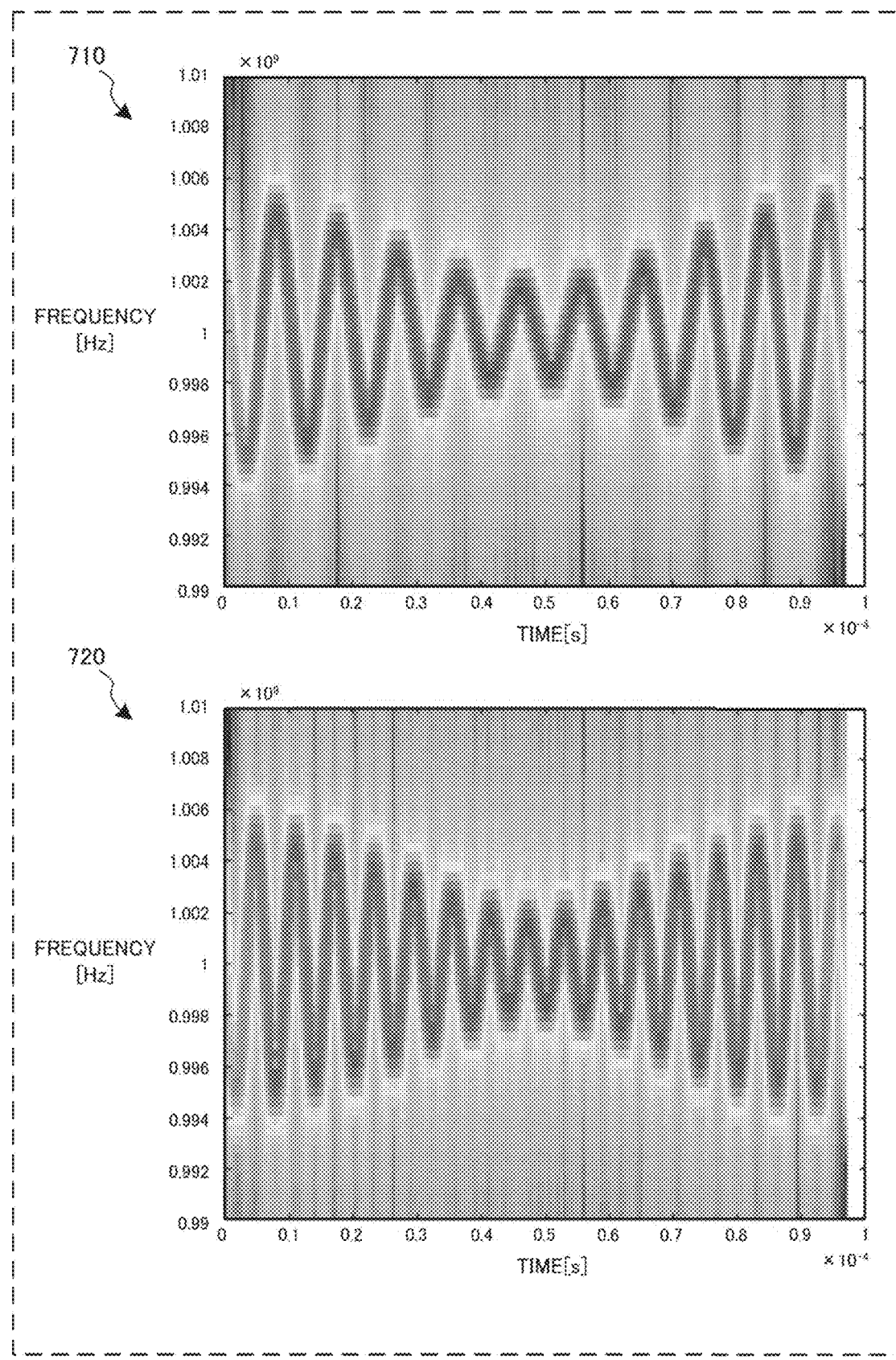
FIG. 7 is a diagram illustrating a spectrogram of a transmission waveform according to the second example embodiment of the present invention.

Hereinafter, with reference to the drawings, example embodiments of the present invention are illustratively described in detail. However, components described in the following example embodiments are merely illustrative and are not intended to limit the technical scope of the present invention to these components.

First Example Embodiment

A signal processing device 100 as a first example embodiment of the present invention is described by using FIG. 1A and FIG. 1B. The signal processing device 100 is a device that outputs a signal for detecting an object, based on a signal reflected from the object.

As illustrated in FIG. 1A, the signal processing device 100 includes at least two cross correlation calculation units 101 and a synthesis unit 102. The at least two cross correlation calculation units 101 each calculate a cross correlation function between a waveform of a reflection signal acquired when a transmission signal having changing frequencies is reflected by a target object and a different correlation waveform generated from a waveform of the transmission signal. The synthesis unit 102 synthesizes at least two cross correlation functions acquired from at least two cross correlation calculation units in such a way that it is difficult to detect a target object in a predetermined speed range and outputs a synthesis result to a post-processing unit.

FIG. 1B is a display example of an object detection result based on a cross correlation function output from the signal processing device 100 according to the present embodiment. A display example of an object detection result is not limited to FIG. 1B.

A display screen 130 (left figure) of FIG. 1B is a display example of a result of detecting an object over an entire speed range. Only ○ represents a still object, ○ with + represents an approaching object, and ○ with − represents a departing object. A still object ○ may have a predetermined speed range around a speed of zero. When the signal processing device 100 of a detection side is moving, a still object ○ is an object that moves at the same speed in the same direction.

A display screen 140 (upper right figure) of FIG. 1B is a display example of a result of detecting an object, based on an output signal that does not detect a still object ○ according to the present example embodiment. In the display screen 140, display of a still object ○ that is not detected disappears, compared with the display screen 130. A display screen 150 (lower right figure) of FIG. 1B is a display example of a result of detecting an object, based on an output signal that does not detect an object outside a predetermined approaching speed range according to the present example embodiment. In the display example 150, display of a still object ○ that is not detected disappears, compared with the display screen 130, and further an object other than an object in a predetermined approaching speed range, i.e., a departing object and an approaching object outside the predetermined approaching speed range disappear, compared with the display screen 140. For example, an approaching object 141 outside a predetermined approaching speed range of the display screen 140 disappears in the display screen 150 (in FIG. 1B, illustrated as a dashed-line approaching object 151).

In FIG. 1B, + is designated as an approaching object and − is designated as a departing object, but as display capable of easily executing discrimination by a user monitoring a display screen, display may be executed by using another different mark or a color difference.

According to the present example embodiment, at least two cross correlation functions are synthesized in such a way that it is difficult to detect a target object in a predetermined speed range and a synthesis result is output to a post-processing unit, and therefore the present example embodiment is able to achieve object detection that does not detect an object in a predetermined speed range.

Second Example Embodiment

Next, a signal processing device according to a second example embodiment of the present invention is described. The signal processing device according to the present example embodiment synthesizes at least two cross correlation functions by executing subtraction between absolute values of these functions. Herein, a predetermined speed range is a range including a speed of zero. In post-processing using an output cross correlation function, processing including at least any one of position detection or speed detection of a target object except a target object in a predetermined speed range is executed. As a different correlation waveform used in cross correlation calculation, a waveform in which a cross ambiguity function between a waveform of a transmission signal and a waveform subjected to a frequency correction is symmetrical with respect to a doppler direction and a gap is generated in a synthesized cross ambiguity function is used. As a different correlation waveform, a waveform in which a waveform subjected to a different frequency correction is added to a waveform of a transmission signal or a waveform in which a waveform subjected to a different expansion/contraction in a time axis is added to a wave form of a transmission signal is used.

On the other hand, a transmission signal used according to the present example embodiment is a waveform in which a value of a self-ambiguity function is large in a vicinity of a delay time of zero and a frequency shift of zero and includes a waveform in which a sinusoidal wave based on frequency modulation of a sinusoidal frequency modulation (SFM) waveform is modified, and specifically includes a waveform in which a frequency increases/decreases in a curved manner and a frequency band width temporally increases/decreases in a curved manner. The transmission signal has a waveform in which a frequency bandwidth is modulated. As a transmission signal according to the present example embodiment, a waveform in which a first waveform in which a frequency increases/decreases in a curved manner and a frequency bandwidth temporally increases/decreases in a curved manner and a second waveform in which an increase/decrease of a frequency is symmetrical with respect to a time direction or a frequency direction are overlapped is also used. Specifically, a BM-SFM being a waveform in which a bandwidth based on frequency modulation of an SFM waveform is modulated is used. A waveform referred to as a twin ASFM (TASFM) acquired by adding two waveforms in which a direction of frequency modulation in an ASFM is reversed is used.

In this manner, a waveform in which a self-ambiguity function is symmetrical with respect to a doppler direction is used as a transmission waveform and computation of a plurality of correlation results based on a waveform subjected to a frequency correction comparable to a doppler effect is executed in reception processing, and thereby a sensitivity to a specific doppler is reduced.

DESCRIPTION OF A PRIOR ART

Before a signal processing device of the present example embodiment is described, a prior art of a signal processing device is described. In NPL 1, as a transmission waveform, a waveform referred to as an M sequence is used. FIG. 3B is a block diagram illustrating a configuration of a signal processing device 350 according to a prior art.

As illustrated in FIG. 3B, the signal processing device 350 includes a transmission waveform generation unit 351 and a correlation calculation unit 354. The transmission waveform generation unit 351 generates a transmission waveform and transmits the generated transmission waveform to a radio transmission unit 352 and the correlation calculation unit 354. The radio transmission unit 352 executes frequency conversion and the like for the transmission waveform, converts the converted transmission waveform to a radio signal, and transmits the converted radio signal from a transmission antenna 356. A radio reception unit 353 receives, via a reception antenna 357, a reflection signal 332 acquired when a transmission signal 331 is reflected by a target object 330, executes frequency conversion and the like for the received radio signal, and transmits the converted radio signal to the correlation calculation unit 354 as a reception waveform of a desired frequency band. The correlation calculation unit 354 calculates a cross correlation function between the transmission waveform and the reception waveform and transmits a calculation result to an absolute value 355. From a cross correlation function output by the absolute value 355, existence of the target object 330 and a distance to the target object 330 are detected.

(Regarding an Ambiguity Function)

A detection ability of a distance is confirmed by display referred to as an ambiguity function. The ambiguity function is defined by equation 1 as described in NPL 2.

[Math. 1]

$$A(\tau, v) = \int_{-\infty}^{\infty} U\left(t + \frac{\tau}{2}\right) U^*\left(t - \frac{\tau}{2}\right) e^{-2\pi i t v} dt \quad \text{(Equation 1)}$$

wherein $A(\tau,v)$ is an ambiguity function, $\tau$ is a time difference, $v$ is a frequency shift amount (doppler effect), and $U(t)$ expresses a waveform with respect to a time $t$. A sign* represents a complex conjugate, $e$ represents a base of a natural logarithm, $i$ represents an imaginary unit, and $\pi$ represents the ratio of the circumference of a circle to its diameter.

An ambiguity function based on equation 1 is referred to also as a self-ambiguity function. A function in which this self-ambiguity function is generalized and a relation between two functions is established is a cross ambiguity function of equation 2.

[Math. 2]

$$A(\tau, v) = \int_{-\infty}^{\infty} U_1\left(t + \frac{\tau}{2}\right) U_2^*\left(t - \frac{\tau}{2}\right) e^{-2\pi i t v} dt \quad \text{(Equation 2)}$$

wherein $U_1(t)$ and $U_2(t)$ are waveforms having a cross correlation. When $U_1(t)$ and $U_2(t)$ are the same, a self-ambiguity function is meant. An ambiguity function has an axis of a time and an axis of a frequency shift amount (doppler).

(Regarding Detection of a Speed/Distance)

Hereinafter, by using an ambiguity function, it is described that a detection ability changes, depending on a waveform used for a transmission waveform and a correlation waveform. An ambiguity function is a complex number, but an absolute value thereof is represented by a density in order to easily view a figure.

When a waveform disclosed in PTL 1 is used for a transmission waveform and a correlation waveform, a spectrogram thereof appears as in FIG. 3C and a self-ambiguity function thereof (a cross ambiguity function in which a transmission waveform itself is used as a correlation waveform) is illustrated in FIG. 3D.

This ASFM occurs at a central frequency of 1 GHz in a modulation bandwidth of 10 MHz (±5 MHz) in a waveform time length of 1 ms. As can be seen from FIG. 3C, in a range of the modulation bandwidth, a frequency linearly changes. When a transmission waveform is used as a correlation waveform, a cross ambiguity function thereof is the same as a self-ambiguity function and appears as in FIG. 3D. A doppler of the vertical axis is converted to a moving speed of a reflective object. When, for example, it is clear that a reflective object does not move, a look at an axis of doppler=zero (m/s) in FIG. 3D may be taken. Only in a narrow vicinity of time=0, a cross ambiguity function is large, and a time, i.e., a distance to a reflective object is accurately understood. However, as a speed of a reflective object is faster, sensitivity decreases. It is understandable that when, for example, a doppler is 0.1×104 (m/s), i.e., an object is an airplane of 360 km/h, a time, i.e., a distance can be also accurately detected, but, on the other hand, in a case of an excessive speed, when, for example, a doppler is 0.5×104 (m/s), i.e., an object is a rocket or missile of 1800 km/h, Mach 1.5, a value of a cross ambiguity function is small, and therefore not only a speed and a distance but also existence itself is not detected.

However, in the above-described prior art, all objects including an object of a speed equal to or smaller than a certain speed are detected, including a still object. Actually, there are a large number of applications in which it is not desirable to detect a still object. A radar for defense surveillance may detect only an airplane moving at high speed. In a radar from an airplane, a still object having a fixed speed when viewed from an own airplane is not an issue and only another airplane of a speed other than this may be detected.

Description of the Present Example Embodiment

According to the present example embodiment, a signal processing device is controlled in such a way as not to detect a reflection signal of a still object or an object in a predetermined speed range including being still, and thereby processing for a still object or an object in a predetermined speed range including being still in post-processing of detecting an object position, a distance, or a speed can be omitted. According to the present example embodiment, a configuration in which the present invention is applied as a specific radar device is described. As correlation waveforms to be correlated, two types of waveforms in which a transmission waveform is subjected to a frequency correction are used and cross correlation functions are synthesized. A feature of the present example embodiment lies in inclusion of a plurality of correlation processing units and a relation between correlation waveforms used in correlation processing units.

Processing Outline of a Signal Processing Device

FIG. 2 is a diagram illustrating a processing outline 200 of a signal processing device according to the present example embodiment. In FIG. 2, a relation between a transmission waveform and two correlation waveforms is described by schematically illustrating an ambiguity function.

As a transmission waveform, a waveform in which an area having a large value of a self-ambiguity function 210 is concentrated at doppler=0 and time=0 and forms an island as illustrated in a left figure (a) of FIG. 2 is used. For example, a waveform of PTL 1 illustrated in FIG. 7 is related thereto.

A self-ambiguity function is a cross ambiguity function when a transmission waveform is used as a correlation waveform, and when as a correlation waveform, a waveform in which a transmission waveform is subjected to a frequency correction applied with a doppler effect is used, an island is formed in a place shifted by the applied doppler effect. According to the present example embodiment, in generation of a correlation waveform used in a plurality of correlation processing units, each island is formed in a place reversely shifted in a doppler direction and a correlation waveform in which a gap having a value of an ambiguity function equal to or smaller than a threshold is formed in a range including a doppler of zero when executing subtraction by taking absolute values is generated.

In (b) and (c) of FIG. 2, cross ambiguity functions 22A and 22B between a correlation waveform used in a correlation processing unit and a transmission waveform are illustrated. When an amount of a frequency correction is appropriately designed, islands having shapes symmetrical with respect to each other can be formed, as in (b) of FIG. 2 and (c) of FIG. 2.

By using a following right figure (d) of FIG. 2, processing and an advantageous effect of synthesis according to the present example embodiment are described. In synthesis processing according to the present example embodiment, each of absolute values of two cross correlation functions calculated from a reception waveform and two correlation waveforms are taken and subtraction between these values is executed. While cross correlation functions each are a complex number and therefore interfere with each other occurs when subtraction is executed directly, a problem of interference can be reduced when subtraction is executed between absolute values. As a result, as illustrated in the right figure (d) of FIG. 2, an ambiguity function 230 as acquired by simply executing subtraction between the central figures (b) and (c) of FIG. 2 is acquired. In the ambiguity function 230 of the right figure (d) of FIG. 2, a gap having a value of an ambiguity function equal to or smaller than a threshold is formed in a range including a doppler of zero. In other words, the ambiguity function of (d) of FIG. 2 is substantially straightly zero horizontally in a vicinity of doppler=0, and therefore it is understood that a reflective object of a horizontal axis, i.e., a speed of zero is not detected. With regard to a reflective object located in a place other than in a vicinity of a speed of zero, a correct time, i.e., a correct distance can be detected.

In formation of the gap, an output signal not including a detection signal of an object in a range including a doppler of zero, i.e., a low speed including being still is generated, and therefore in post-processing, a reception signal in which an object of a low speed including being still is already eliminated may be processed, and simplification and acceleration of processing are achieved. There are a plurality of waveforms in which a self-ambiguity function forms an island as in (a) of FIG. 2 and a cross correlation function between waveforms thereof and a cross ambiguity function are small. When these waveforms are used, an advantageous effect enabling to execute an operation in the same frequency band can be also produced.

Functional Configuration of a Signal Processing Device

FIG. 3A is a block diagram illustrating a functional configuration of a signal processing device 310 according to the present example embodiment. In FIG. 3A, the signal processing device 310 according to the present example embodiment is illustrated as a receiver. The signal processing device 310 according to the present example embodiment may be also configured to include a transmitter 320.

The transmitter 320 includes a transmission waveform generation unit 321, a radio transmission unit 322, and a transmission antenna 323. The transmission waveform generation unit 321 generates a transmission waveform and transmits the transmission waveform to the radio transmission unit 322. The radio transmission unit 322 converts the transmission waveform to a radio signal by executing frequency conversion and the like for the transmission waveform and transmits the converted radio signal from the transmission antenna 323 to a target object 330 as a transmission signal 331.

In FIG. 3A, the signal processing device 310 includes a radio reception unit 311, a correlation processing unit 312, a correlation processing unit 313, a synthesis unit 314, and a reception antenna 315. The radio reception unit 311 receives a reflection signal 332 from the target object 330 via the reception antenna 315, executes frequency conversion and the like for the received radio signal, and transmits the converted radio signal to the correlation processing units 312 and 313 as a reception waveform of a desired frequency band. The correlation processing units 312 and 313 generate correlation waveforms different from each other, based on a transmission waveform or information of a transmission waveform, calculate cross correlation functions between the reception waveform and each of the correlation waveforms, and transmit the calculated cross correlation functions to the synthesis unit 314. Each of the correlation waveforms is generated from the transmission waveform and sampling is synchronized. The synthesis unit 314 includes absolute value generation units 341 and 342, a subtraction unit 343, and an absolute value generation unit 344, and receives the cross correlation functions from the correlation processing units 312 and 313, takes absolute values thereof, and outputs a synthesized cross correlation function from an output unit 316. The absolute value generation unit 344 indicated by a dashed line may not necessarily be included in the synthesis unit 314 when being included in a post-processing unit that executes post-processing including position detection of an object, distance detection, speed detection, and the like by using an output signal from the output unit 316. The same applies to example embodiments described below.

(Correlation Processing Unit)

FIG. 4 is a block diagram illustrating a functional configuration of the correlation processing units 312 and 313 according to the present example embodiment.

The correlation processing unit 312 includes a correlation waveform generation unit 401 and a correlation calculation unit 402. The correlation waveform generation unit 401 receives a transmission waveform or information of a transmission waveform and generates a waveform in which a certain expansion/contraction is applied to the transmission waveform as a correlation waveform. The correlation calculation unit 402 calculates a cross correlation between a reception waveform and the correlation waveform. The correlation processing unit 313 is similar to the correlation processing unit 312 as a configuration, but a correlation waveform generated by the correlation waveform generation unit 401 is different. A difference between the correlation processing units 312 and 313 is a difference in an amount of a frequency correction applied to a correlation waveform. An amount of a frequency correction is set in the correlation processing unit 312 and the correlation processing unit 313 in such a way as to be symmetrical with respect to a speed a sensitivity of which is intended to be low.

(Correlation Waveform Generation Unit)

FIG. 5 is a block diagram illustrating a functional configuration of the correlation waveform generation unit 401 according to the present example embodiment. The correlation waveform generation unit 401 generates a waveform subjected to a frequency correction comparable to an application of a doppler effect to a transmission waveform. As generation of a waveform subjected to a frequency correction comparable to an application of a doppler effect, a waveform in which a transmission waveform is frequency-shifted may be generated or a waveform in which a transmission waveform is expanded/contracted in a time direction may be generated. An amount of an applied frequency correction is appropriately set by the correlation processing units.

In FIG. 5, a correlation waveform generation unit 401+ indicates the correlation waveform generation unit 401 included in the correlation processing unit 312, and a correlation waveform generation unit 401− indicates the correlation waveform generation unit 401 included in the correlation processing unit 313. The correlation waveform generation unit 401+ includes a corrected waveform generation unit 501+ that executes a frequency correction to a plus, and the correlation waveform generation unit 401− includes a corrected waveform generation unit 501− that executes a frequency correction to a minus.

(Synthesis Unit)

FIG. 6A and FIG. 6B each are a diagram illustrating synthesis processing of the synthesis unit 314 in which a central portion of an ambiguity function according to the present example embodiment is viewed as a cross-section.

When by using a waveform having a self-ambiguity function 601 bilaterally symmetrical as in (a) of FIG. 6A, a correlation processing unit executes a symmetrical frequency correction, cross ambiguity functions 602 and 603 as in (b) and (c) of FIG. 6A are acquired. Absolute values are taken, and thereby simple subtraction is possible and as a result of synthesis, a cross ambiguity function 604 as in (d) of FIG. 6A is acquired. A sensitivity is low at a doppler of zero of a center, i.e., at a speed of zero. In other words, it is understood that a sensitivity to a still object or an object of a small moving speed is low. While in the cross ambiguity function 604 of (d) of FIG. 6A, there is a difference in plus/minus, however, this is not problematic in display when an absolute value is further taken at a time of display (605). When post-processing is executed by using an absolute value 605 after synthesis, a condition in which the absolute value 605 exceeds a threshold Th may be set.

FIG. 6B is a diagram illustrating synthesis processing of the synthesis unit 314 in which a detection range of a central portion of an ambiguity function according to the present example embodiment is viewed as a cross-section. FIG. 6B repeatedly illustrates the absolute value 605 of FIG. 6A.

In an absolute value 606 in which the cross ambiguity functions 602 and 603 as in (b) and (c) of FIG. 6A are caused to be close to each other in a direction of a speed of zero, detection of an object in a narrower speed range may be omitted around a speed of zero. In an absolute value 607 in which mutual departing is executed in a direction opposite to a speed of zero, detection of an object of a wider speed range may be omitted around a speed of zero. Further, when a threshold Th is changed, a speed range where detection is omitted can be changed. When, for example, a threshold Th is raised, detection of an object of a wider speed range can be omitted around a speed of zero (see 608).

Ambiguity Function of a Spectrogram

Hereinafter, observation display examples of features in each unit according to the present example embodiment are illustrated in FIG. 7 to FIG. 9A. While an ambiguity function is a complex number, an absolute value thereof is indicated by a density in order to easily view the drawings.

(Spectrogram of a Transmission Waveform)

FIG. 7 illustrates spectrograms 710 and 720 of a transmission waveform according to the present example embodiment. The transmission waveform according to the present example embodiment is a newly-devised bandwidth modulator-sinusoidal frequency modulation (BM-SFM) waveform. A BM-SFM is a waveform in which a frequency bandwidth (bandwidth) is modulated and is a waveform in which a frequency increases/decreases in a curved manner and a bandwidth temporally increases/decreases in a curved manner.

FIG. 7 illustrates spectrograms 710 and 720 with respect to two types of BM-SFM waveform examples. The waveform is, as can be seen from FIG. 7, an FM modulation wave (SFM) in which a frequency vibrates in a sinusoidal wave manner and further is applied with modulation in which a bandwidth based on FM modulation of an SFM increases/decreases. A difference between the waveform examples is a difference in the number (cycle) of sinusoidal wave-like vibrations of an SFM. In a waveform of the spectrogram 710, vibrations occur 10.5 times for 1 ms, and in contrast, in a waveform of the spectrogram 720, vibrations occur 15.5 times.

(Self-Ambiguity Function)

Figure 8:
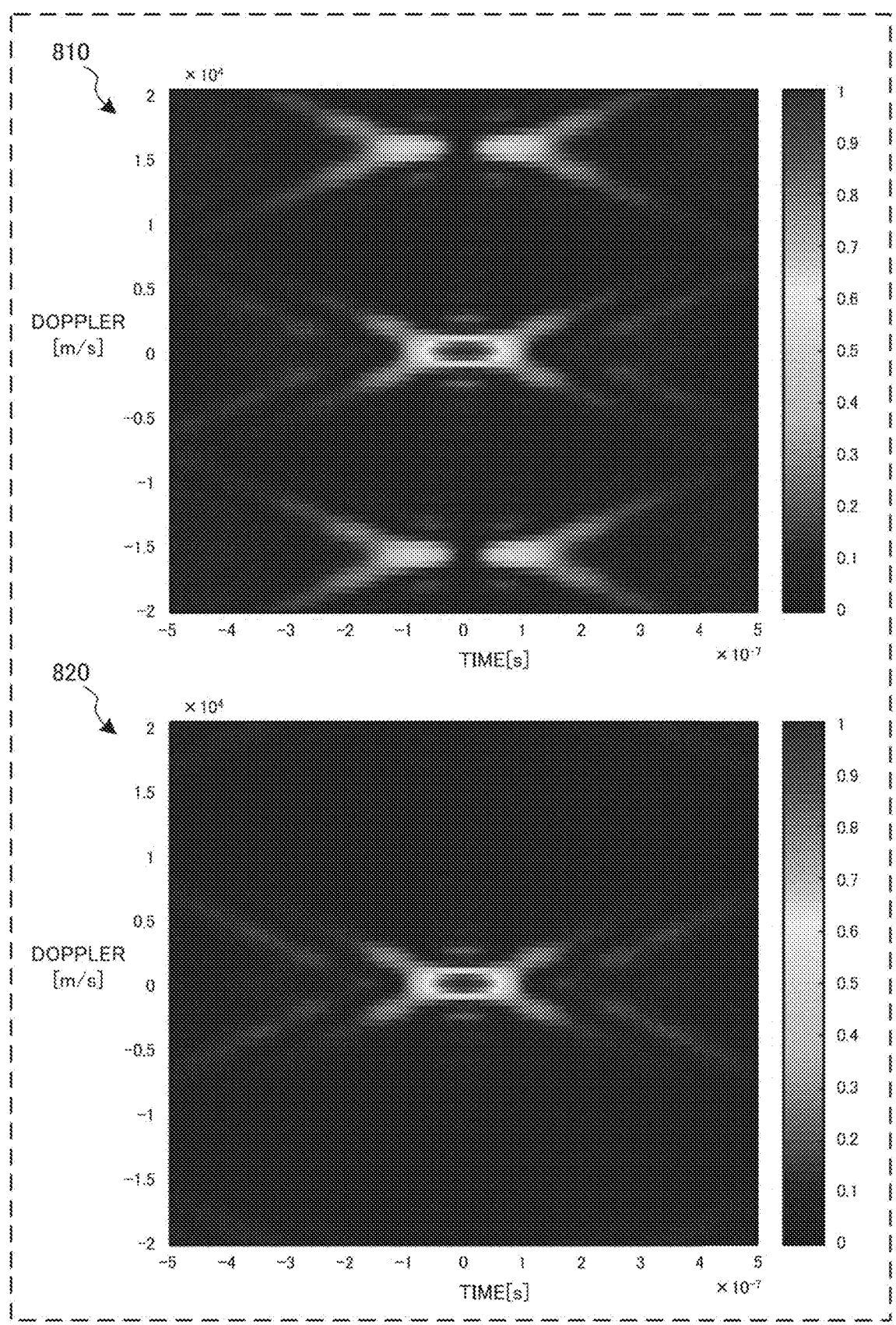
FIG. 8 is a diagram illustrating a self-ambiguity function according to the second example embodiment of the present invention.

FIG. 8 is a diagram illustrating self-ambiguity functions 810 and 820 according to the present example embodiment. A maximum value of a doppler shift in FIG. 8 is comparable to a speed of an artificial satellite or a rocket.

The self-ambiguity function 810 is a self-ambiguity function of a BM-SFM waveform example of the spectrogram 710, and the self-ambiguity function 820 is a self-ambiguity function of a BM-SFM waveform example of the spectrogram 720. As can be seen from FIG. 8, in a self-ambiguity function of each of these waveforms, an island concentrated in a central vicinity is formed based on complex modulation. In the self-ambiguity function 810, an island is located in a separate place, but an object having a speed up to this is only an artificial satellite or a rocket and therefore there is no practical problem. Further, when the number of vibrations is increased, a separate island can be substantially unseen by causing the island to be remote as in the self-ambiguity function 820.

(Synthesized Cross Ambiguity Function)

Figure 9A:
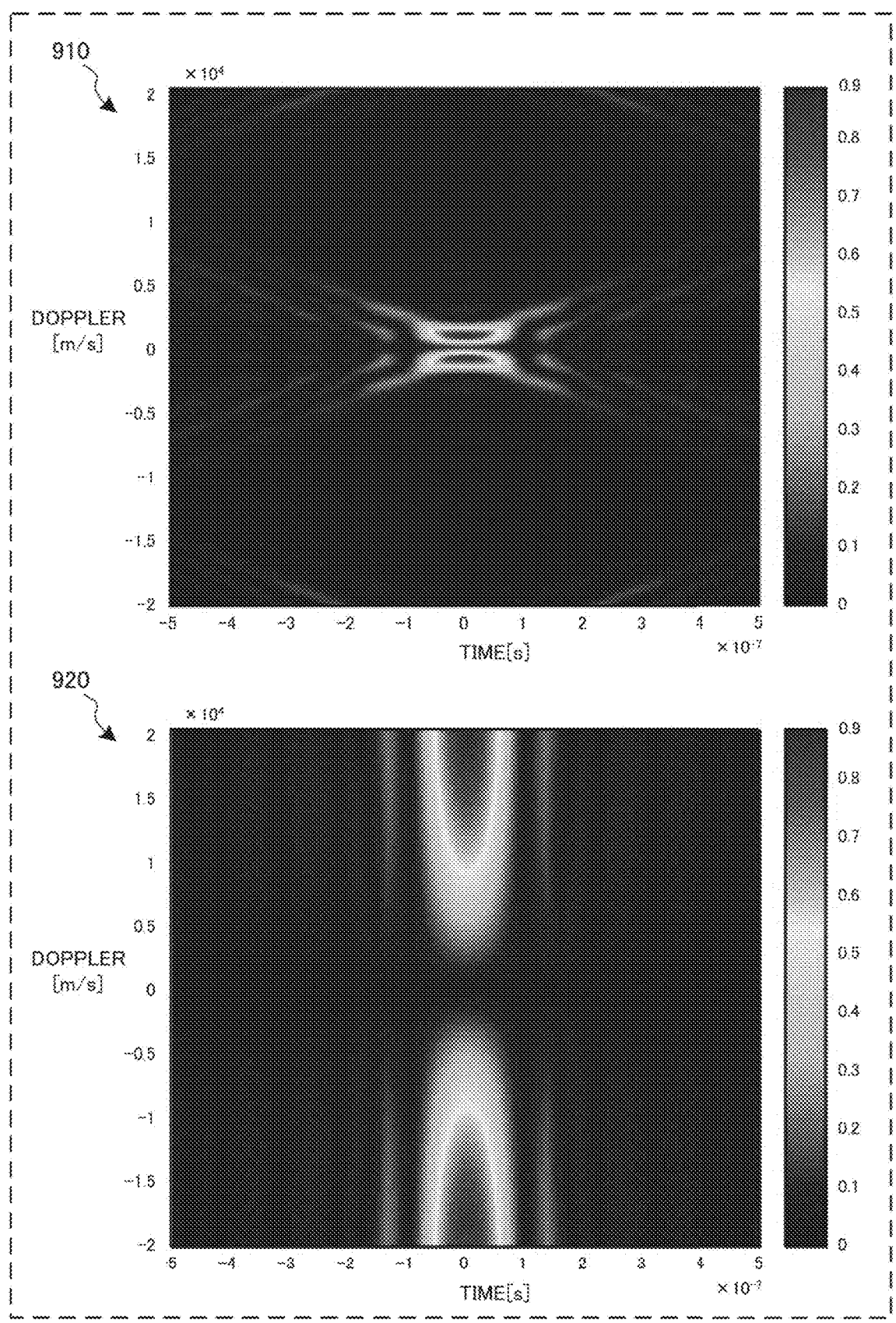
FIG. 9A is a diagram illustrating a cross ambiguity function synthesized in a synthesis unit according to the second example embodiment of the present invention.

FIG. 9A is a diagram illustrating a cross ambiguity function synthesized in the synthesis unit 314 according to the present example embodiment.

According to the present example embodiment, a cross ambiguity function of a correlation function output by the synthesis unit 314 when for the BM-SFM waveform example of the spectrogram 720, an amount of a doppler effect in a correlation processing unit is +0.0005% (1.000005) and −0.0005% (approximately 0.999995) is illustrated in FIG. 9A. A lower figure of FIG. 9A is a figure in which an upper figure of FIG. 9A is expanded vertically, i.e., in a doppler direction. In a vicinity of doppler=0, substantially straightly zero is indicated horizontally, and therefore an advantageous effect of the present example embodiment that a reflective object of a horizontal axis, i.e., a speed of zero is not detected and a correct time, i.e., a distance can be detected for a reflective object of a speed other than a speed of zero can be understood.

A similar advantageous effect is produced also when the BM-SFM waveform example of the spectrogram 720 is replaced with the BM-SFM waveform example of the spectrogram 710. A cross ambiguity function between the BM-SFM waveform example of the spectrogram 720 and the BM-SFM waveform example of the spectrogram 710 is small and separable, and therefore an advantageous effect of being able to execute a plurality of operations in the same frequency band can be produced. While a difference between the BM-SFM waveform example of the spectrogram 720 and the BM-SFM waveform example of the spectrogram 710 is a difference in the number of times of sinusoidal wave-like frequency modulation, a large number of waveforms, being separable, in which a plurality of operations are possible can be produced when the number of times of repetition of the modulation is changed.

In addition, waveforms, being separable, in which a self-ambiguity function is substantially symmetrical can be produced. A waveform different depending on a radar may be used among such waveforms. A duration time of a waveform used according to the present example embodiment is long, and therefore an advantageous effect in that a power maximum value for acquiring the same signal-to-noise ratio is small, compared with a waveform of a pulse doppler radar is produced.

(Post-Processing Unit: Detection of an Object)

Figure 9B:
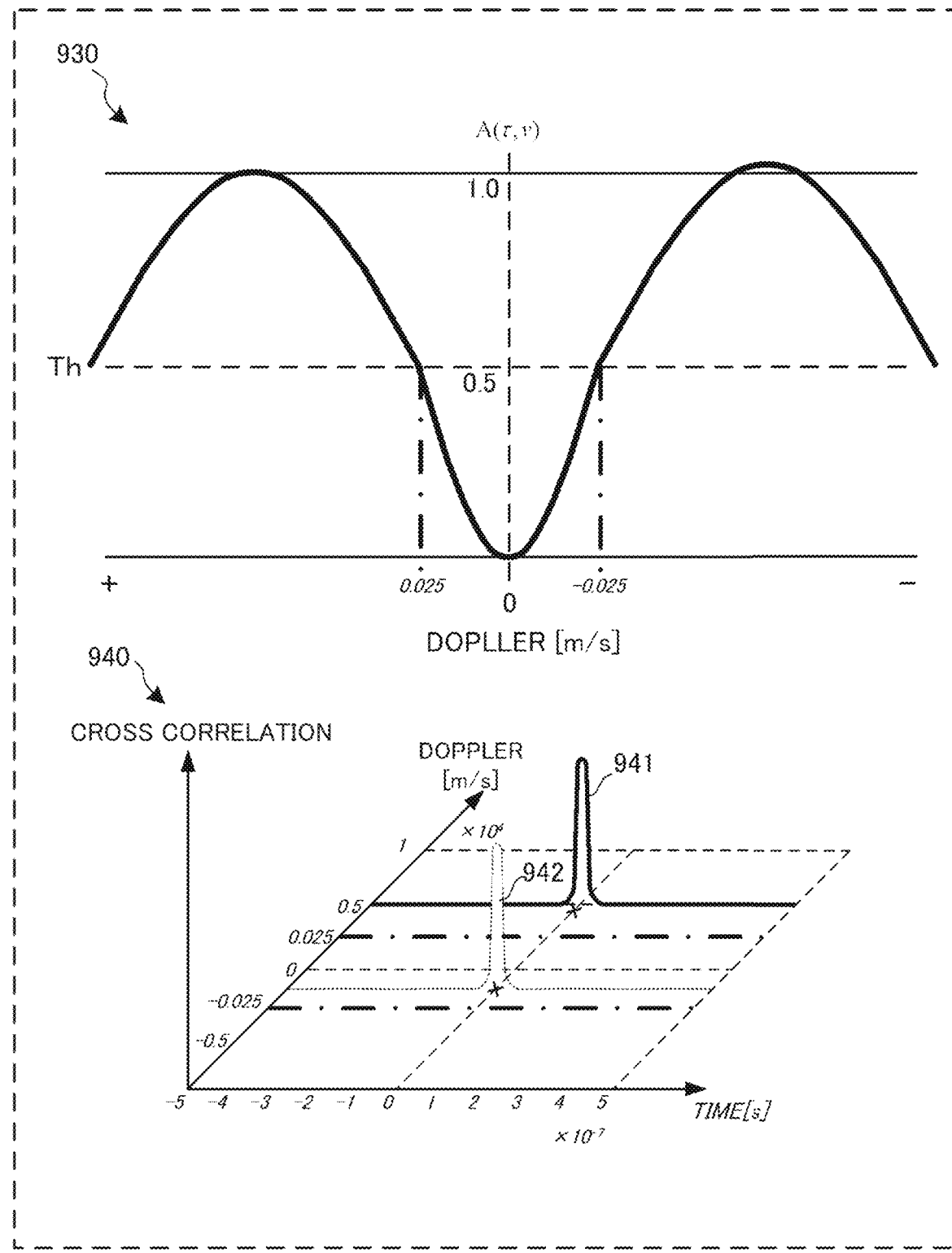
FIG. 9B is a diagram illustrating a relation between a synthesized state of a cross ambiguity function synthesized in the synthesis unit according to the second example embodiment of the present invention and an output cross correlation function.

FIG. 9B is a diagram illustrating a relation between a synthesized state of a cross ambiguity function synthesized in the synthesis unit 314 according to the present example embodiment and an output cross correlation function. Post-processing is not limited to the present example. All types of post-processing applied with a signal generated based on processing of causing an object in a predetermined speed range according to the present example embodiment to be difficult to detect are included.

Referring to an upper figure of FIG. 9B, as a synthesized state 930, a range falling below a threshold Th is generated around a doppler of zero by further taking an absolute value for a subtraction result of absolute values of two cross ambiguity functions. The synthesized state is merely one example and may be appropriately adjusted based on another condition for the signal processing device 310.

In a lower figure of FIG. 9B, as one example, a cross correlation function 940 in which objects of two different moving speeds exist is illustrated. In a cross ambiguity function, a result in which a value of a cross correlation function is equal to or larger than a predetermined value is cut in a vicinity of zero in a doppler shift direction, and an object is not detected when a moving speed of a moving object is zero or close to zero (see 942 of FIG. 9B) and an object can be accurately detected outside a predetermined range including zero (see 941 of FIG. 9B).

Modified Example of the Present Example Embodiment

Figure 10:
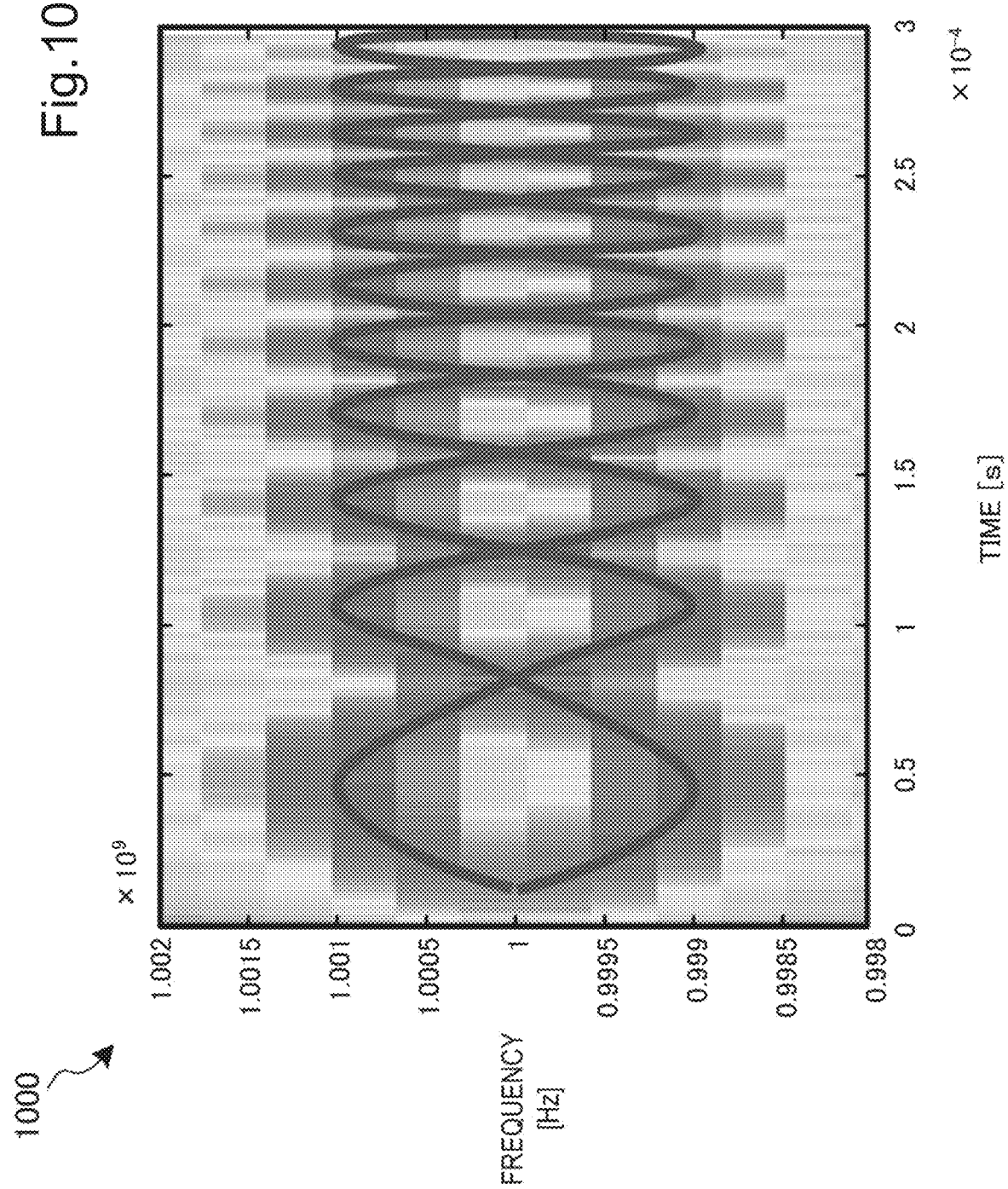
FIG. 10 is a diagram illustrating a spectrogram of another transmission waveform according to the second example embodiment of the present invention.
Figure 11:
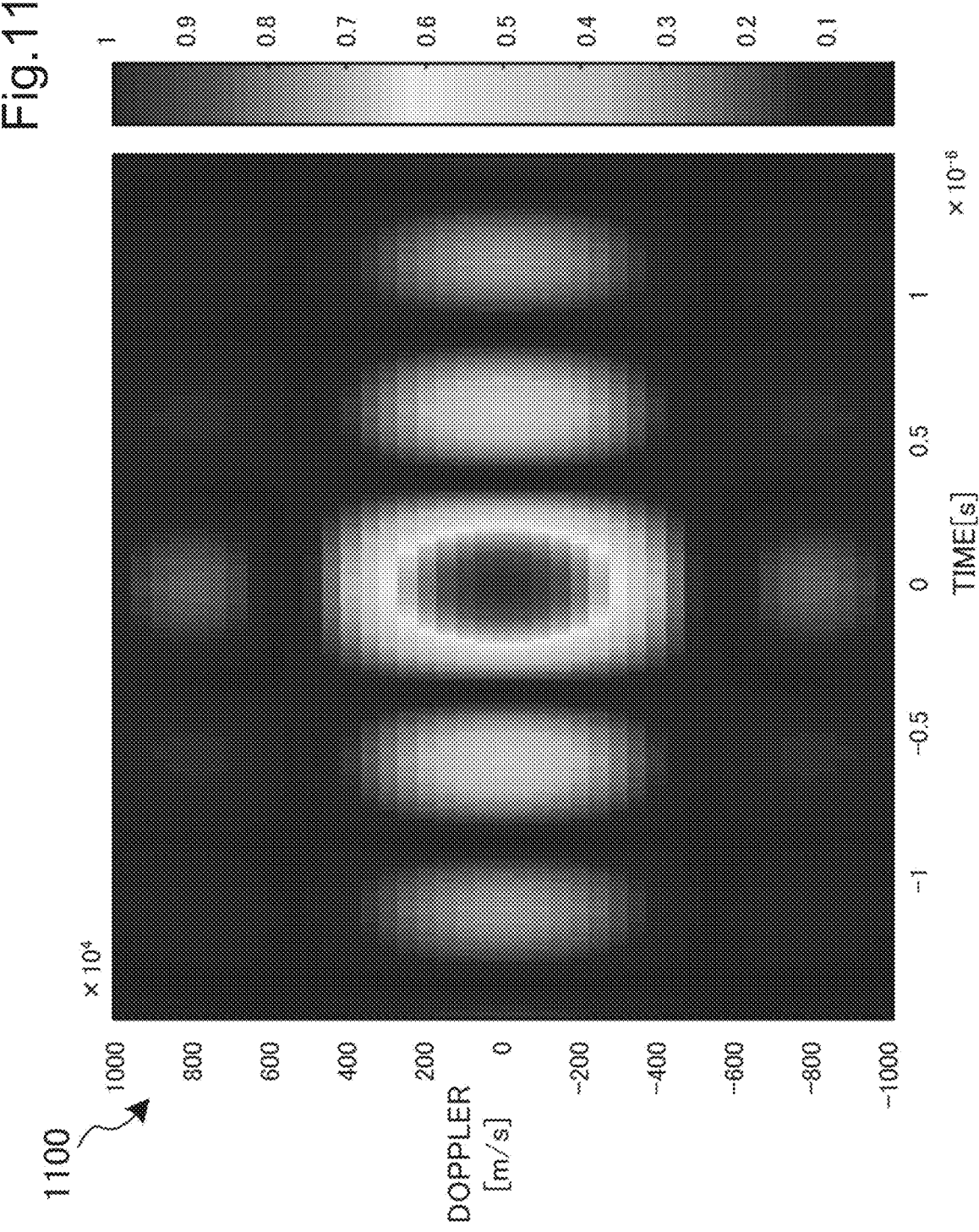
FIG. 11 is a diagram illustrating a self-ambiguity function in another transmission waveform according to the second example embodiment of the present invention.
Figure 12:
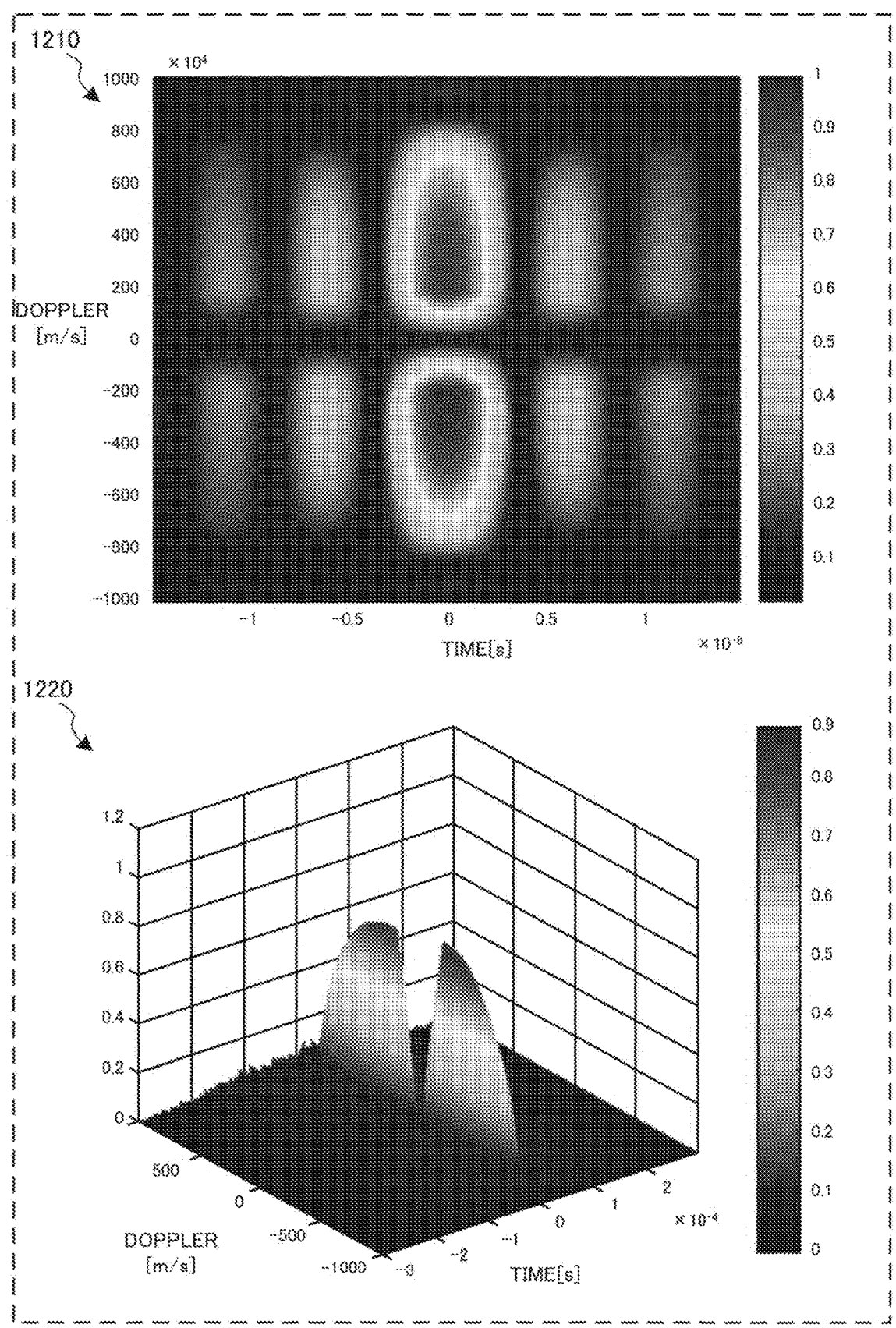
FIG. 12 is a diagram stereoscopically displaying a cross ambiguity function in another transmission waveform according to the second example embodiment of the present invention and an ambiguity function of a synthesized correlation function in a wide-range time.

With reference to FIG. 10 to FIG. 12, an example using another transmission waveform according to the present example embodiment is described.

(Spectrogram of a Transmission Waveform)

FIG. 10 is a diagram illustrating a spectrogram 1000 of another transmission waveform according to the present example embodiment.

The transmission waveform is acquired by adding two waveforms in which directions of frequency modulation in an ASFM are opposite to each other. Hereinafter, the transmission waveform is referred to as a twin ASFM (TASFM). It is assumed that a central frequency is 1 GHz, a bandwidth of FM modulation is 2 MHz (±1 MHz), and a waveform length is 30 μs. While a spectrogram appears to be protruding from a bandwidth of FM modulation since resolution is insufficient, a black solid line is an intended curve of frequency modulation.

(Self-Ambiguity Function)

FIG. 11 is a diagram illustrating a self-ambiguity function 1100 in another transmission waveform according to the present example embodiment.

While a cross ambiguity function of an ASFM is not symmetrical with respect to a doppler direction as illustrated in FIG. 3D, a symmetrical self-ambiguity function can be acquired as in FIG. 11 by adding a waveform symmetrical with respect to a direction of FM modulation.

(Synthesized Cross Ambiguity Function)

FIG. 12 is a diagram stereoscopically displaying a cross ambiguity function 1210 in another transmission waveform according to the present example embodiment and an ambiguity function 1220 of a synthesized correlation function in a wide-range time.

When an amount of a doppler effect in a correlation processing unit is +0.00025% (1.0000025) and −0.00025% (approximately 0.9999975) with respect to TASFM waveforms of FIG. 9A and FIG. 9B, a cross ambiguity function of a correlation function output by the synthesis unit 314 is illustrated in FIG. 12. An upper figure of FIG. 12 is displayed by being expanded in a doppler direction, and a lower figure thereof is stereoscopically displayed in a wide doppler range. In a vicinity of doppler=0, substantially straightly zero is indicated horizontally, and therefore a reflective object of a horizontal axis, i.e., a speed of zero is not detected and a correct time, i.e., a distance can be detected for a reflective object of a speed other than a speed of zero.

Hardware Configuration of a Signal Processing Device

Figure 13:
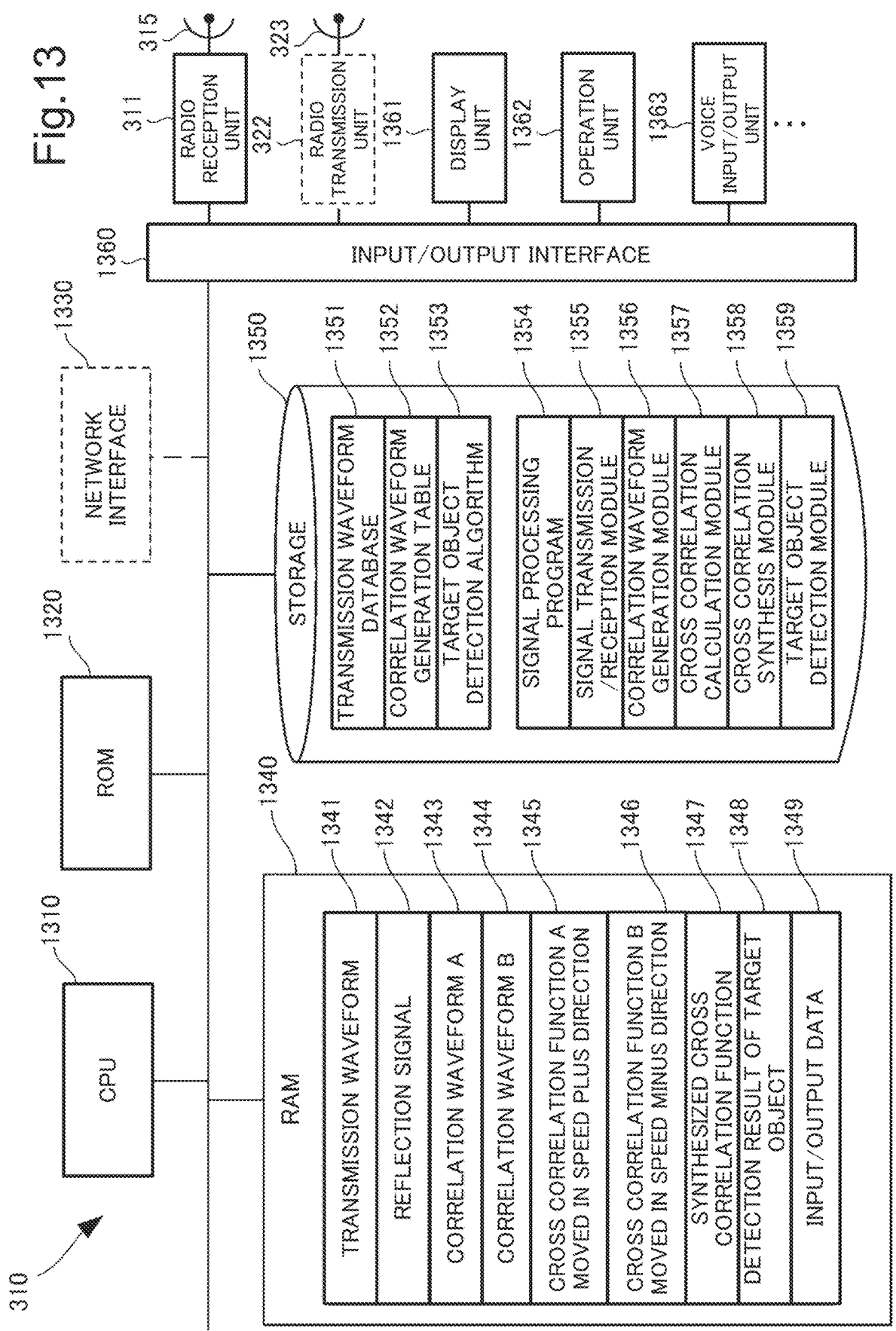
FIG. 13 is a block diagram illustrating a hardware configuration of the signal processing device according to the second example embodiment of the present invention.

FIG. 13 is a block diagram illustrating a hardware configuration of the signal processing device 310 according to the present example embodiment.

In FIG. 13, a central processing unit (CPU) 1310 is an arithmetic control processor and achieves, by executing a program, functional configuration units of FIG. 3A, FIG. 4, and FIG. 5. There may be a plurality of CPUs 1310 in association with each function. A read only memory (ROM) 1320 stores fixed data such as initial data, a program, and the like and a program. A network interface 1330 controls communication with another device via a network.

A random access memory (RAM) 1340 is a random access memory used by the CPU 1310 as a transitory storage work area. In the RAM 1340, an area for storing data necessary for achieving the present example embodiment is provided. A transmission waveform 1341 stores a transmission waveform of a transmission signal to be used or used. A reflective signal 1342 stores a reflective signal reflected from a target object and then received. A correlation waveform A1343 stores one correlation waveform generated based on the transmission waveform 1341 according to the present example embodiment. A correlation waveform B1344 stores the other correlation waveform generated based on the transmission waveform 1341 according to the present example embodiment. The correlation waveform A1343 and the correlation waveform B1344 are generated, by subtraction between absolute values of two cross ambiguity functions, in such a way that a gap is generated around a doppler of zero in a cross ambiguity function.

A cross correlation function A1345 moved in a speed plus direction is a cross correlation calculation result between a correlation waveform A and a reception waveform of the reflection signal 1342. A cross correlation function B1346 moved in a speed minus direction is a cross correlation calculation result between a correlation waveform B and a reception waveform of the reflection signal 1342. A synthesized cross correlation function 1347 is a cross correlation calculation result with a gap in a zero vicinity acquired by synthesizing a cross correlation function A1345 moved in a speed plus direction and a cross correlation function B1346 moved in a speed minus direction. A detection result 1348 of a target object is, when the signal processing device 310 includes the post-processing unit, information including a distance to a target object or a moving speed of a target object acquired based on the synthesized cross correlation function 1347. Input/output data 1349 are data input to/output from an input/output device including a radio reception unit 311 via an input/output interface 1360.

A storage 1350 stores a database and various types of parameters, or data or a program described below necessary for achieving the present example embodiment. A transmission waveform database 1351 is a database storing a transmission waveform to be used. A correlation waveform generation table 1352 is a table for correcting the used transmission waveform 1341 and generating the correlation waveform A1343 and the correlation waveform B1344. A target object recognition algorithm 1353 is, when the signal processing device 310 includes the post-processing unit, an algorithm detecting a target object according to the present example embodiment.

The storage 1350 stores a program described below. A signal processing program 1354 is a program controlling the entire processing of the signal processing device 310 according to the present example embodiment. A signal transmission/reception module 1355 is a module controlling transmission of a transmission signal and reception of a reflection signal. The signal transmission/reception module 1355 operates only as a signal reception module when the present signal processing device 310 is a device including only a detection function of a target object based on reception of a reflection signal. A correlation waveform generation module 1356 is a module generating the correlation waveform A1343 and the correlation waveform B1344, based on the transmission waveform 1341, by using the correlation waveform generation table 1352. A cross correlation calculation module 1357 is a module calculating a cross correlation between a reception waveform of a reflection signal and each of correlation waveforms. A cross correlation synthesis module 1358 is a module synthesizing each cross correlation function calculated in the cross correlation calculation module 1357. A target object detection module 1359 is, when the signal processing device 310 includes the post-processing unit, a module detecting a target object, based on a cross correlation function synthesized in the cross correlation synthesis module 1358.

The input/output interface 1360 executes interfacing in order to control data input to/output from an input/output device. According to the present example embodiment, the input/output interface 1360 is connected with the radio reception unit 311 receiving the signal from the reception antenna 315 and the radio transmission unit 322 transmitting a signal to the transmission antenna 323. When the present signal processing device 310 includes only a detection function of a target object based on reception of a reception signal, the transmission antenna 323 and the radio transmission unit 322 are unnecessary. The input/output interface 1360 may be further connected with a display unit 1361, an operation unit 1362, and a voice input/output unit 1363.

In the RAM 1340 and the storage 1350 of FIG. 13, a program and data relating to a general-purpose function and another achievable function included in the signal processing device 310 are not illustrated.

(Correlation Waveform Generation Table)

FIG. 14 is a diagram illustrating a configuration of the correlation waveform generation table 1352 according to the present example embodiment. The correlation waveform generation table 1352 is used for generating a corrected waveform by subtly correcting a waveform, based on a transmission waveform and forming a correlation waveform.

The correlation waveform generation table 1352 stores, in association with a transmission waveform 1401, data 1402 for generating a correlation waveform A and data 1403 for generating a correlation waveform B. Data 1402 of the correlation waveform A and data 1403 of the correlation waveform B are corrected in such a way that a gap can be generated in a zero vicinity by subtraction between absolute values in a cross ambiguity function.

When a plurality of transmission waveforms 1401 are selected and used, an appropriate corrected waveform associated with each transmission waveform 1401 is stored as a correlation waveform. A plurality of transmission waveforms 1401 include, for example, BM-SFM waveforms different in a cycle of a frequency change illustrated in FIG. 6A and FIG. 6B and TASFM waveforms illustrated in FIG. 10 but are not limited thereto.

Processing Procedure of a Signal Processing Device

Figure 15:
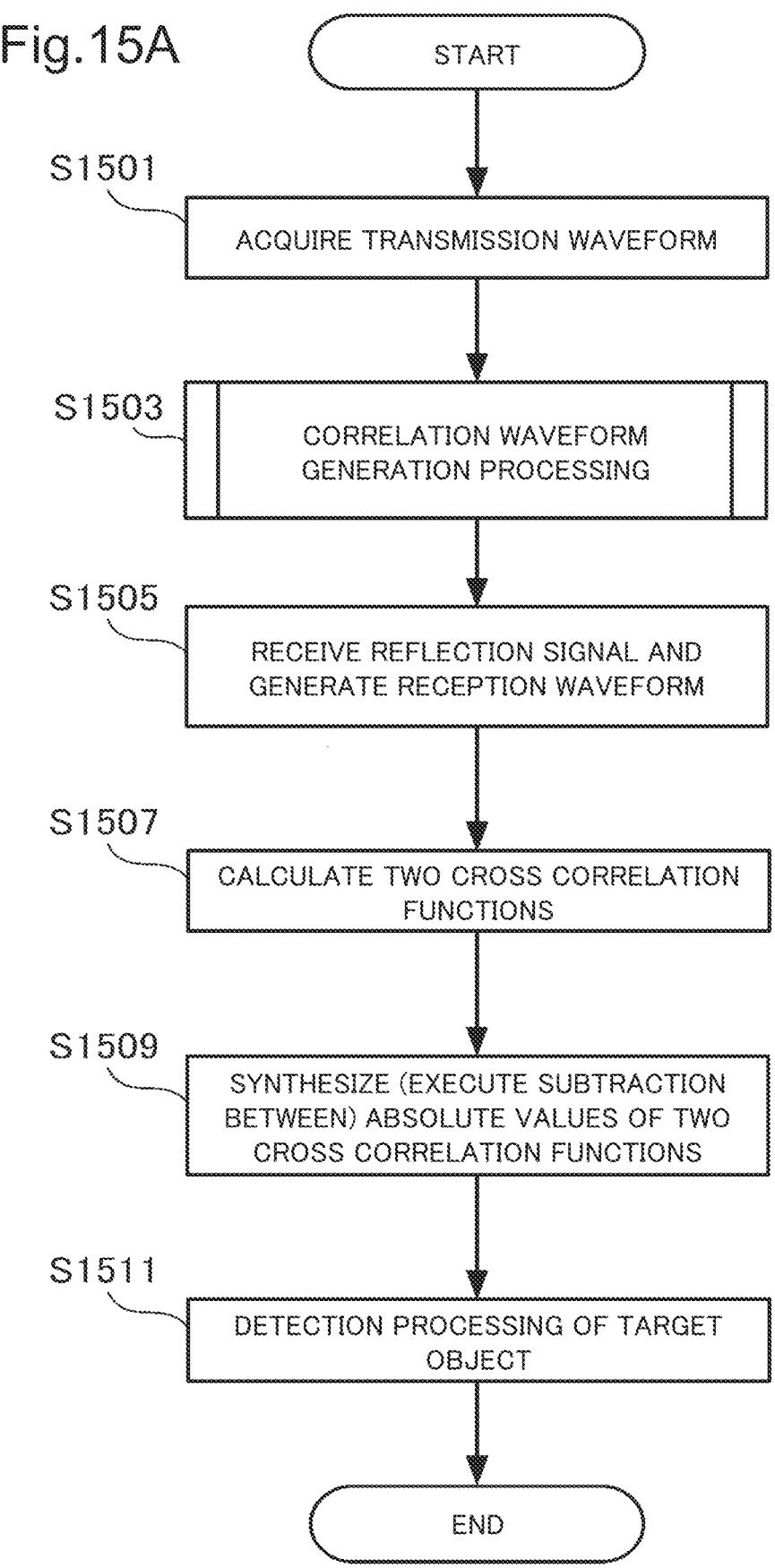
FIG. 15A is a flowchart illustrating a processing procedure of the signal processing device according to the second example embodiment of the present invention.
FIG. 15B is a flowchart illustrating a procedure of correlation waveform generation processing according to the second example embodiment of the present invention.

FIG. 15A is a flowchart illustrating a processing procedure of the signal processing device 310 according to the present example embodiment. The flowchart is executed by the CPU 1310 of FIG. 13 by using the RAM 1340, and thereby functional configuration units of FIG. 3A, FIG. 4, and FIG. 5 are achieved.

The signal processing device 310 acquires a transmission waveform in step S1501. With regard to acquisition of a transmission waveform, acquisition is made from the transmitter 320 when the present signal processing device 310 does not include a transmission function or acquisition is made from a storage unit (not illustrated) previously storing a transmission waveform. Acquisition is made from the transmission waveform generation unit 321 when the present signal processing device 310 includes a transmission function. The signal processing device 310 executes, in step S1503, correlation waveform generation processing of generating two correlation waveforms for calculating a cross correlation function with a reception waveform, based on a transmission waveform.

The signal processing device 310 receives, in step S1505, a reflection signal from a target object and generates a reception waveform. The signal processing device 310 calculates, in step S1507, two cross correlation functions from a reception waveform and two correlation waveforms generated in step S1503. The signal processing device 310 synthesizes (executes subtraction between), in step S1509, absolute values of two cross correlation functions. The signal processing device 310 detects, when including the post-processing unit, in step S1511, a target object from a synthesized cross correlation function.

(Correlation Waveform Generation Processing)

FIG. 15B is a flowchart illustrating a procedure of correlation waveform generation processing (S1503) according to the present example embodiment.

The signal processing device 310 acquires, in step S1521, from a correlation waveform generation table, a set of frequency corrections, based on transmission waveforms, in which cross ambiguity functions are separate in a doppler effect direction (=moving speed direction) and when being synthesized, a gap can be generated in a zero vicinity in a cross correlation function. A method of generating the set of frequency corrections has been described in association with FIG. 9A.

The signal processing device 310 corrects, in step S1523, transmission waveforms by using a set of frequency corrections acquired in step 1521 and generates a set of corrected waveforms. The signal processing device 310 sets, in step S1525, a generated set of corrected waveforms as a set of correlation waveforms.

According to the present example embodiment, two waveforms in which a transmission waveform is frequency-shifted are generated and subtraction is executed between correlation functions with a reception waveform by using absolute values thereof, and thereby reaction to reflection from an object of a specific speed can be made difficult to occur.

A transmission waveform is not a short pulse, and therefore a maximum value of power consumption is small. A long, complex transmission waveform is employed, and therefore a correlation can be small even at the same frequency. In other words, a concurrent operation is possible with a relatively low power and in the same frequency band. Characteristics that control a sensitivity for a speed (=sensitivity for a doppler) can be provided with a small computation amount.

Third Example Embodiment

Next, a signal processing device according to a third example embodiment of the present invention is described. The signal processing device according to the present example embodiment is different from the second example embodiment in that instead of generation of a gap in a doppler zero (still) vicinity based on subtraction between absolute values of cross correlation functions, a gap is generated in a predetermined speed range separate from a doppler of zero. Other components and operations are similar to associated components and operations according to the second example embodiment, and therefore the same component is assigned with the same reference number, as well as for the same operation and detailed description thereof is omitted.

According to the present example embodiment, sensitivity is decreased only for a still object and a reflective object of a specific speed. An application is made when, for example, from an airplane, another airplane is intended to be found and an object on a ground is not intended to be found. When a speed to which sensitivity is low is set to be the same as a speed of a radar-installed platform, a sensitivity to a still object is decreased even from a moving platform. A relative speed is different depending on a direction, and therefore it is necessary to consider directionality of a radar antenna. When, for example, sharp directionality is provided to a front face, reflection from an object of an undesirable speed can be made difficult to detect.

Processing Outline of a Signal Processing Device

Figure 16:
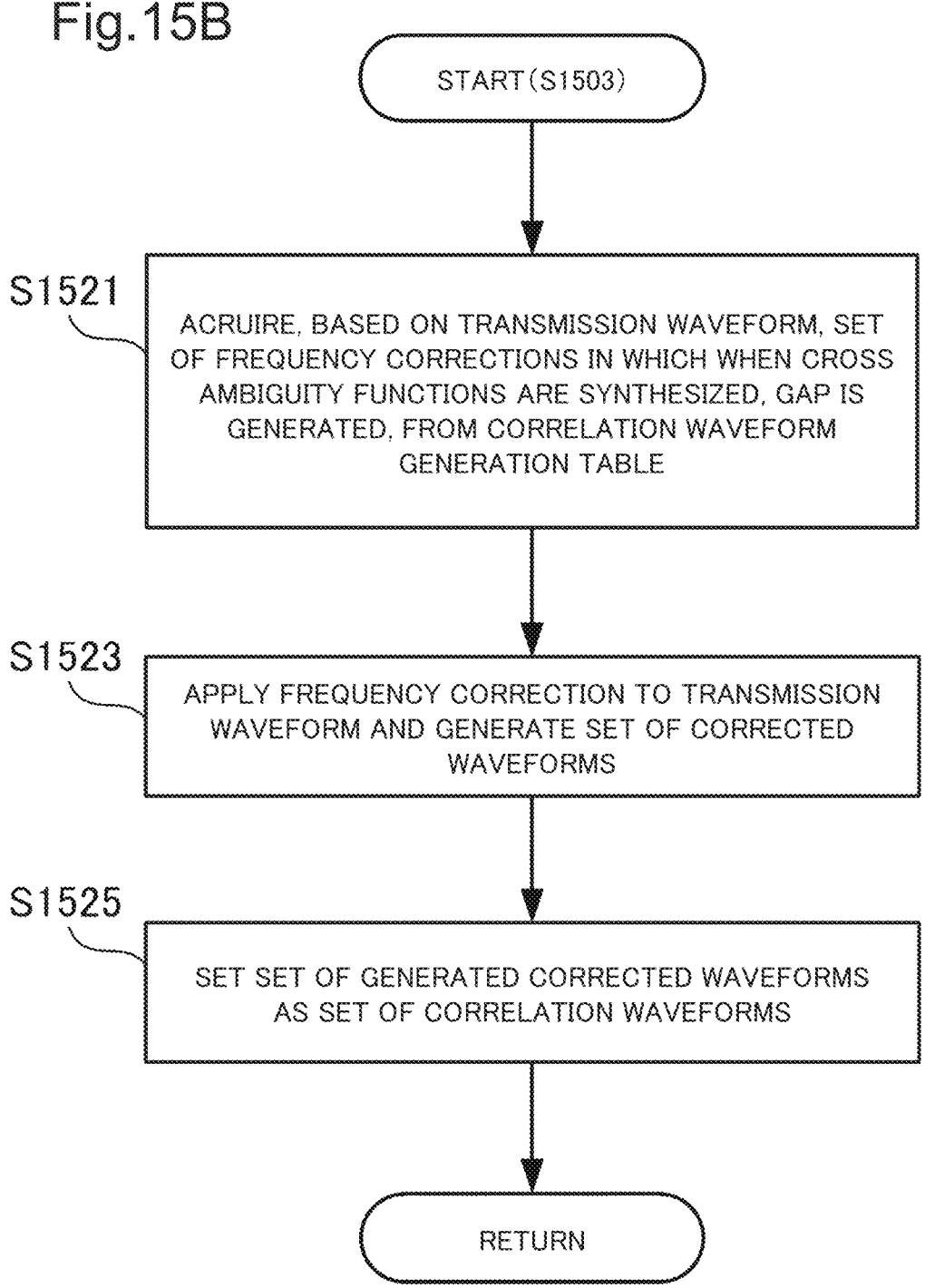
FIG. 16 is a diagram illustrating a processing outline of a signal processing device according to a third example embodiment of the present invention.

FIG. 16 is a diagram illustrating a processing outline 1600 of the signal processing device according to the present example embodiment. In FIG. 16, a component similar to an associated component of FIG. 2 is assigned with the same reference number and overlapping description is omitted.

While a self-ambiguity function of a transmission waveform illustrated in (a) of FIG. 16 is the same as in (a) of FIG. 2, an amount of a frequency correction is different, and therefore (b) and (c) of FIG. 16 move in a parallel manner in a minus direction of a doppler axis, relative to associated (b) and (c) of FIG. 2, respectively. As a result, in (d) of FIG. 16 as a synthesis result, a speed (doppler) to which sensitivity is low appears in a departing direction, compared with (d) of FIG. 2.

(Correlation Waveform Generation Table)

FIG. 17 is a diagram illustrating a configuration of a correlation waveform generation table 1752 according to the present example embodiment. While a configuration of the present example embodiment is similar to FIG. 3A of the second example embodiment, the correlation processing units 312 and 313 are different in an amount of a frequency correction.

In the correlation waveform generation table 1752, with respect to a TASFM waveform example of a spectrogram 1000 of a transmission waveform 1401, an amount of a doppler effect in a correlation processing unit is set as +0.00015% (1.0000015) for a correlation waveform C1702 and is set as −0.00035% (approximately 0.9999965) for a correlation waveform D1703. A numerical value of the correlation waveform generation table 1752 is not limited to FIG. 17.

(Synthesized Cross Ambiguity Function)

Figure 18:
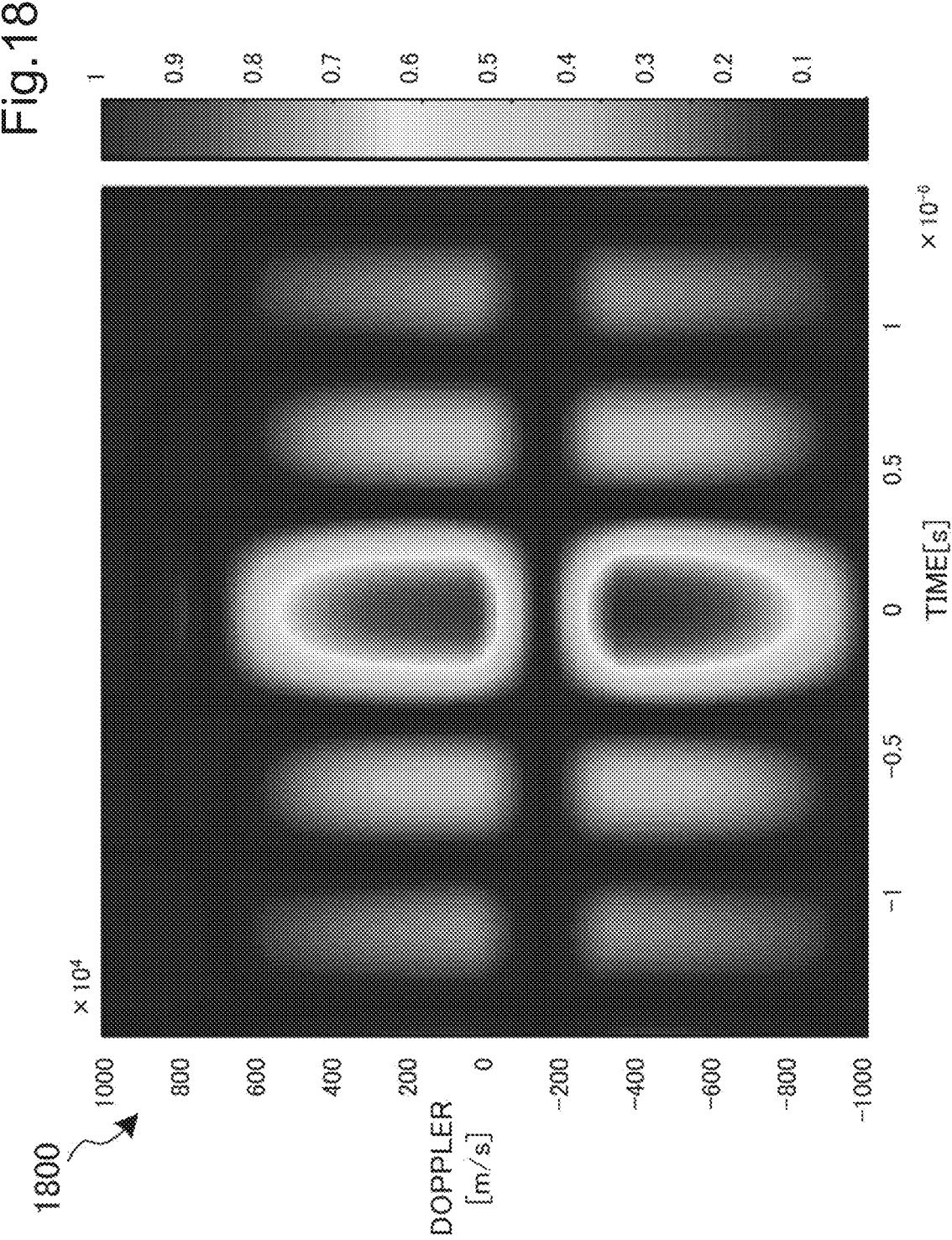
FIG. 18 is a diagram illustrating a cross ambiguity function based on synthesis in which an amount of a frequency shift according to the third example embodiment of the present invention is changed.

FIG. 18 is a diagram illustrating a cross ambiguity function 1800 based on synthesis in which an amount of a frequency shift according to the present example embodiment is changed.

FIG. 18 illustrates a cross ambiguity function between correlation functions output by the synthesis unit 314 in which with respect to a TASFM waveform, an amount of a frequency correction in a correlation processing unit is set as +0.00015% (1.0000015) and −0.00035% (approximately 0.9999965). It is understood that in a vicinity associated with a doppler at a speed of −150 m/s, sensitivity is low and an object of the speed is difficult to detect.

According to the present example embodiment, a speed to which sensitivity is low can be freely designed as a specific speed, instead of a zero vicinity.

Fourth Example Embodiment

A signal processing device according to a fourth example embodiment of the present invention is described. There is a difference in that while according to the second example embodiment and the third example embodiment described above, detection of a still object can be eliminated but it is difficult to detect an object having an excessive speed, the signal processing device according to the present example embodiment detects an object even in a wide speed range where an object has a high speed. Other components and operations are similar to associated components and operations according to the second example embodiment, and therefore the same component is assigned with the same reference number, as well as for the same operation and detailed description thereof is omitted.

Processing Outline of a Signal Processing Device

FIG. 19A is a diagram illustrating a processing outline 1910 of the signal processing device according to the present example embodiment. In FIG. 19A, a component similar to an associated component of FIG. 2 is assigned with the same reference number and overlapping description is omitted.

In (a) of FIG. 19A, an ambiguity function 230 in which an absolute value of a synthesis result of the synthesis unit 314 according to the second example embodiment is taken is illustrated. In a speed zero vicinity, specifically, at a speed of zero, sensitivity is low. According to the present example embodiment, a correlation processing unit is further added and a correlation waveform configured in such a way as to detect a reflective object moving at high speed, i.e., a large frequency correction is applied, and thereby cross ambiguity functions 192Y and 192Z of (b) and (c) of FIG. 19A in which an absolute value of the correlation function is taken are generated.

When the ambiguity function 230 and the cross ambiguity functions 192Y and 192Z are synthesized (added), a cross ambiguity function 1930 of a cross correlation function acquired in the output unit 316 produces an advantageous effect of decreasing a sensitivity in a speed zero vicinity and can increase a sensitivity for all realistic speeds other than this, as in (d) of FIG. 19A.

In FIG. 19A, two types of correlation processing were added in order to detect up to a reflective object of a very high speed, but only one type may be sufficient. When a larger number of correlation processing units are added, up to a higher speed or a more precise speed can be detected.

FIG. 19B is a diagram illustrating another processing outline 1920 of the signal processing device according to the present example embodiment. In FIG. 19B, a component similar to an associated component of FIG. 2 or FIG. 19A is assigned with the same reference number and overlapping description is omitted.

In (a) of FIG. 19B, an ambiguity function 230 in which an absolute value of a synthesis result of the synthesis unit 314 according to the second example embodiment is taken is illustrated. In a speed zero vicinity, specifically, at a speed of zero, sensitivity is low. According to the present example, a correlation processing unit is further added, and a cross ambiguity function 1630 of (e) of FIG. 19B as illustrated in FIG. 16 shifted to a doppler minus direction in order to decrease a sensitivity to an object departing at a predetermined speed is generated. A correlation waveform configured in such a way as to detect a reflective object moving at high speed, i.e., a large frequency correction is applied and cross ambiguity functions 194Y and 194Z in (b) and (c) of FIG. 19B in which an absolute value of the correlation function is taken are generated.

When the ambiguity function 230, the cross ambiguity function 1630, the cross ambiguity functions 194Y and 194Z are synthesized (added), a cross ambiguity function 1950 of a cross correlation function acquired in the output unit 316 produces an advantageous effect of being able to decrease a sensitivity in a speed zero vicinity and increasing a sensitivity for all realistic speeds other than this and can decrease sensitivity in a predetermined departing speed vicinity, as in (d) of FIG. 19B.

In FIG. 19B, when a predetermined departing speed is controlled in such a way as to be set at a moving speed of a signal processing device, a sensitivity of a still object and an object moving at the same speed in the same direction can be decreased. In following FIG. 20 to FIG. 24B, description related to processing of FIG. 19B is omitted, but the processing can be easily understood from description of FIG. 20 to FIG. 24B.

Functional Configuration of a Signal Processing Device

Figure 20:
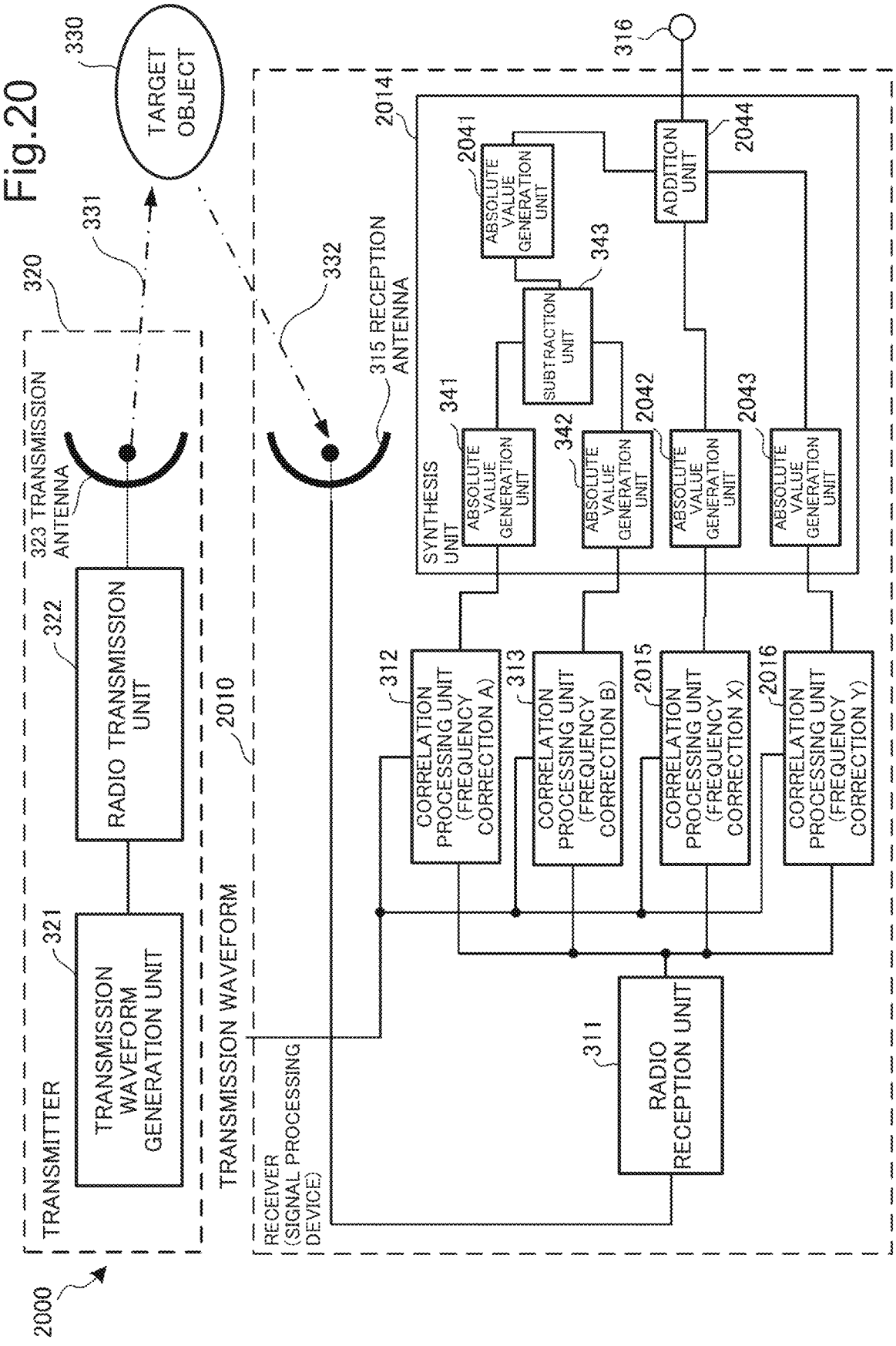
FIG. 20 is a block diagram illustrating a functional configuration of the signal processing device according to the fourth example embodiment of the present invention.

FIG. 20 is a block diagram illustrating a functional configuration of a signal processing device 2010 according to the present example embodiment. In FIG. 20, a functional configuration unit similar to an associated functional configuration unit of FIG. 3A is assigned with the same reference number and overlapping description is omitted.

A difference from FIG. 3A of the second example embodiment is that the signal processing device 2010 is added with correlation processing units 2015 and 2016 and the synthesis device 314 is replaced with a synthesis device 2014. While a configuration of the correlation processing units 2015 and 2016 is similar to a configuration of the correlation processing units 312 and 313, the number of corrected waveforms for generating a correlation waveform and an amount of a frequency correction in each corrected waveform are different. A plurality of different frequency corrections herein are used for detecting up to a high-speed object and are set to be larger than an amount of a frequency correction in the correlation processing units 312 and 313. With regard to cross correlation functions acquired in the correlation processing units 2015 and 2016, absolute values are taken in absolute value generation units 2042 and 2043 in such a way that it is difficult that interference occurs. Absolute values from the absolute value generation units 2042 and 2043 are added, in an addition unit 2044, with an absolute value from an absolute value generation unit 2041 and are output from an output unit 316 as a synthesized cross correlation function.

(Correlation Processing Unit)

Figure 21:
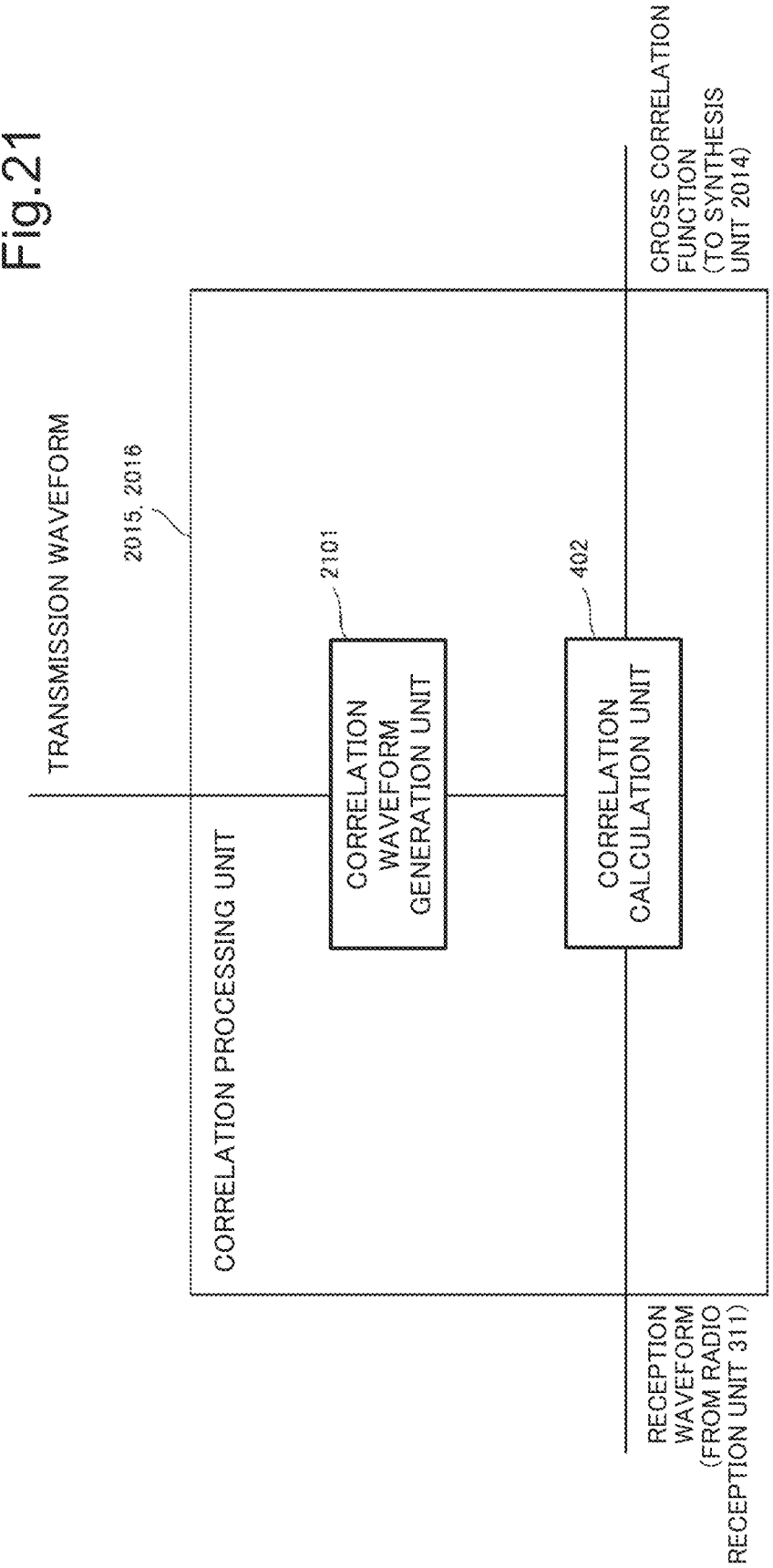
FIG. 21 is a block diagram illustrating a functional configuration of a correlation processing unit according to the fourth example embodiment of the present invention.

FIG. 21 is a block diagram illustrating a functional configuration of the correlation processing units 2015 and 2016 according to the present example embodiment. In FIG. 21, a functional configuration unit similar to an associated functional configuration unit of FIG. 4 is assigned with the same reference number and overlapping description is omitted.

The correlation processing units 2015 and 2016 each include a correlation waveform generation unit 2101 and a correlation calculation unit 402. The correlation waveform generation unit 2101 receives a transmission waveform or information of a transmission waveform and generates, as a correlation waveform, a waveform added with two or more waveforms in which a transmission waveform is subjected to a certain expansion/contraction. The correlation calculation unit 402 calculates a cross correlation between a reception waveform and the correlation waveform. While the correlation processing units 2015 and 2016 are similar in a configuration, correlation waveforms generated by the correlation waveform generation unit 2101 are different from each other.

(Correlation Waveform Generation Unit)

FIG. 22 is a block diagram illustrating a functional configuration of the correlation waveform generation unit 2101 according to the present example embodiment.

The correlation waveform generation unit 2101 includes a corrected waveform generation unit 2201$n$ (n=1, 2, . . . N) and an addition unit 2202. A transmission waveform or information of a transmission waveform is distributed to the corrected waveform generation unit 2201$n$ (n=1, 2, . . . N). The corrected waveform generation unit 2201$n$ generates a waveform subjected to a frequency correction comparable to an application of a doppler effect to a transmission waveform and transmits the generated waveform to the addition unit 2202. The addition unit 2202 outputs, as a correlation waveform, a waveform added with a waveform received from the corrected waveform generation unit 2201$n$ (n=1, 2, . . . N). As generation in the corrected waveform generation unit 2201 of a waveform subjected to a frequency correction comparable to an application of a doppler effect, a waveform in which a transmission waveform is frequency-shifted may be generated or a waveform in which a transmission waveform is expanded/contracted in a time direction may be generated.

(Correlation Waveform Generation Table)

FIG. 23 is a diagram illustrating a configuration of a correlation waveform generation table 2352 according to the present example embodiment. In FIG. 23, a component similar to an associated component of FIG. 14 is assigned with the same reference number and overlapping description is omitted.

The correlation waveform generation table 2352 stores, in association with a transmission waveform 1401, data 2304 for generating a correlation waveform X of the present example embodiment and data 2305 for generating a correlation waveform Y, in addition to data 1402 of a correlation waveform A and data 1403 of a correlation waveform B for generating a gap in a doppler zero vicinity. As data 2304, a plurality of corrected waveforms for generating a correlation waveform X and an added waveform X in which a plurality of corrected waveforms are added are stored. As data 2305, a plurality of corrected waveforms for generating a correlation waveform Y and an added waveform Y in which a plurality of corrected waveforms are added are stored. While data 2304 of the correlation waveform X are indicated by a first waveform, a third corrected waveform, . . . and data 2305 of the correlation waveform Y are indicated by a second waveform, a fourth corrected waveform, . . . , it is indicated that corrected waveforms are corrected in such a way as to mutually fill a gap in a cross ambiguity function.

Processing Procedure of a Signal Processing Device

Figure 24A:
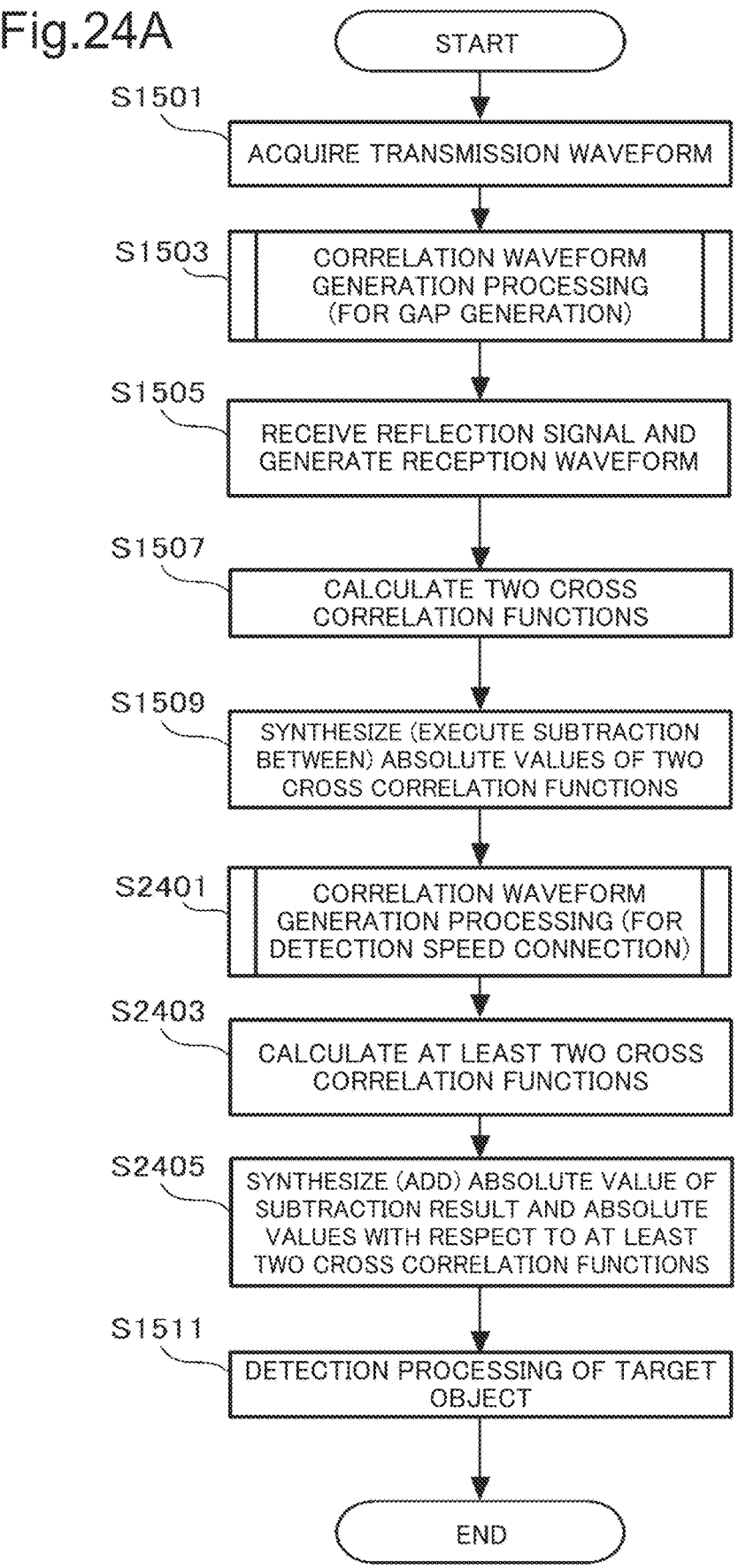
FIG. 24A is a flowchart illustrating a processing procedure of the signal processing device according to the fourth example embodiment of the present invention.

FIG. 24A is a flowchart illustrating a processing procedure of the signal processing device 2010 according to the present example embodiment. The flowchart is executed by the CPU 1310 of FIG. 13 by using the RAM 1340, and thereby functional configuration units of FIG. 20 to FIG. 22 are achieved. In FIG. 24A, a step similar to an associated step of FIG. 15A is assigned with the same step number and overlapping description is omitted.

The signal processing device 2010 executes, in step S2401, correlation waveform generation processing of generating at least two correlation waveforms (two correlation waveforms in the present example) connected with a detection speed for calculating a cross correlation function with a reception waveform, based on a transmission waveform.

The signal processing device 2010 calculates, in step S2403, two cross correlation functions from a reception waveform and the two correlation functions generated in step S2401. The signal processing device 2010 synthesizes (adds), in step S2405, an absolute value of a subtraction result in FIG. 15A and absolute values of the two cross correlation functions.

(Correlation Waveform Generation Processing)

FIG. 24B is a flowchart illustrating a procedure of correlation waveform generation processing (S2401) according to the present example embodiment.

The signal processing device 2010 acquires, in step S2421, based on a transmission waveform, a set of frequency corrections in which there is no doppler zero vicinity, and each cross ambiguity function is separated in a doppler effect direction (=moving speed direction) and an island portion having a high cross correction function is continued when synthesized, from a correlation waveform generation table.

With regard to a method of generating the set of frequency corrections, a state where, for example, values for cross correlation functions with respect to two cross ambiguity functions are overlapped approximately at half a maximum value is assumed. The synthesis state is merely one example and may be appropriately adjusted in accordance with another condition for the signal processing device 2010.

The signal processing device 2010 corrects, in step S2423, a transmission waveform by using the set of frequency corrections acquired in step S2421 and generates a plurality of sets of corrected waveforms. The signal processing device 2010 adds, in step S2425, the plurality of generated corrected waveforms in each set and generates a correlation function.

According to the present example embodiment, in addition to an advantageous effect of decreasing a sensitivity in a speed zero vicinity, sensitivity can be increased for all realistic speeds other than this. In addition, sensitivity can be decreased in a plurality of speed vicinities.

Fifth Example Embodiment

Next, a signal processing device according to a fifth example embodiment of the present invention is described. The signal processing device according to the present example embodiment is different from the second example embodiment to the fourth example embodiment in that an approaching one (approaching object) and a departing one (departing object) are detected by being discriminated. Other components and operations are similar to associated components and operations according to the second example embodiment to the fourth example embodiments, and therefore the same component is assigned with the same reference number, as well as for the same operation and detailed description thereof is omitted.

Processing Outline of a Signal Processing Device

FIG. 25 is a diagram illustrating a processing outline 2500 of the signal processing device according to the present example embodiment. In FIG. 25, a magnitude of an ambiguity function is assigned with a plus/minus sign.

Figures (a) to (d) of FIG. 25 respectively illustrate cross ambiguity functions 252E to 252H each acquired by calculating a cross correlation function between a correlation function added with a plurality of corrected waveforms generated in the example embodiments and a reception waveform.

When subtraction is executed between absolute values of the cross ambiguity functions 252E and 252F as in (a) and (b) of FIG. 25, a plus/minus cross ambiguity function 252M as in (e) of FIG. 25 is acquired. On the other hand, when subtraction is executed between absolute values of the cross ambiguity functions 252G and 252H as in (c) and (d) of FIG. 25, a plus/minus cross ambiguity function 252N as in (f) of FIG. 25 is acquired. When these (e) and (f) of FIG. 25 are added, a plus/minus cross ambiguity function 2530 as in (g) of FIG. 25 is acquired.

In the cross ambiguity function, in addition to an advantageous effect of decreasing a sensitivity in a speed zero vicinity, there is a sensitivity at a speed other than this and plus and minus signs are different based on a plus/minus of a doppler (speed), i.e., whether to approach or depart. When display is changed based on the plus/minus signs, an approaching object and a departing object are clearly specified to a user. When an absolute value of an addition result is taken, a sign is always plus and thereby it is possible to cause an approaching object and a departing object not to be discriminated.

Functional Configuration of a Signal Processing Device

FIG. 26 is a block diagram illustrating a functional configuration of a signal processing device 2610 according to the present example embodiment. In FIG. 26, a functional configuration unit similar to an associated functional configuration unit of FIG. 3A or FIG. 20 is assigned with the same reference number and overlapping description is omitted.

A difference from the fourth example embodiment illustrated in FIG. 20 is first that correlation waveforms used in correlation processing units 2615 to 2618 are different. Next, the synthesis unit 2014 is replaced with a synthesis unit 2614. In the synthesis unit 2614, the absolute value generation unit 2041 in the synthesis unit 2014 is eliminated, and a subtraction unit 2646 is inserted in a path from absolute value generation units 2042 and 2043 to an addition unit 2044.

(Synthesis Unit)

FIG. 27 is a diagram illustrating synthesis processing of the synthesis unit 2614 in which a central portion of an ambiguity function according to the present example embodiment is viewed as a cross-section. FIG. 27 is a diagram schematically illustrating a cross-section in which (e), (f), and (g) of FIG. 25 are cut along a doppler axis.

In (e) of FIG. 27, a cross ambiguity function 2701 output from the subtraction unit 343 is illustrated. In (f) of FIG. 27, a cross ambiguity function 2702 output from the subtraction unit 2646 is illustrated. In (g) of FIG. 27, a cross ambiguity function 2703 output from the addition unit 2044 is illustrated.

According to the present example embodiment, a cross correlation function associated with the cross ambiguity function 2703 produces an advantageous effect of decreasing a sensitivity in a speed zero vicinity and an advantageous effect of causing a sensitivity to be fixed at a speed other than this and discriminating an approaching object from a departing object.

Sixth Example Embodiment

Next, a signal processing device according to a sixth example embodiment of the present invention is described. The signal processing device according to the present example embodiment discriminates an approaching one (approaching object) from a departing one (departing object) and detects both objects but is different from the fifth example embodiment in disposition of a subtraction unit and an addition unit in a synthesis unit. Other components and operations are similar to associated components and operations according to the fifth example embodiment, and therefore the same component is assigned with the same reference number, as well as for the same operation and detailed description thereof is omitted.

Processing Outline of a Signal Processing Device

FIG. 28 is a diagram illustrating a processing outline 2800 of the signal processing device according to the present example embodiment. In FIG. 28, a magnitude of an ambiguity function is assigned with a plus/minus sign. In FIG. 28, a component similar to an associated component of FIG. 25 is assigned with the same reference number and overlapping description is omitted.

Figures (a) to (d) of FIG. 28 are different from (a) to (d) of FIG. 25 only in a pair.

When absolute values of cross ambiguity functions 252E and 252G as in (a) and (c) of FIG. 28 are added, a plus cross ambiguity function 252P as in (h) of FIG. 28 is acquired. On the other hand, when absolute values of cross ambiguity functions 252F and 252H as in (b) and (d) of FIG. 28 are added, a minus cross ambiguity function 252Q as in (i) of FIG. 28 is acquired. When subtraction is executed between these (h) and (i) of FIG. 28, a plus/minus cross ambiguity function 2530, as in (g) of FIG. 28, being the same as (g) of FIG. 25 is acquired.

In this cross ambiguity function, in addition to an advantageous effect of decreasing a sensitivity in a speed zero vicinity, there is a sensitivity at a speed other than this and plus and minus signs are different based on a plus/minus of a doppler (speed), i.e., whether to approach or depart. When display is changed based on the plus/minus signs, an approaching object and a departing object are clearly specified to a user. When an absolute value of an addition result is taken, a sign is always plus and thereby it is possible to cause an approaching object and a departing object not to be discriminated.

Functional Configuration of a Signal Processing Device

FIG. 29 is a block diagram illustrating a functional configuration of a signal processing device 2910 according to the present example embodiment. In FIG. 29, a functional configuration unit similar to an associated functional configuration unit of FIG. 26 is assigned with the same reference number and overlapping description is omitted.

A difference from the fifth example embodiment illustrated in FIG. 26 is first that disposition of correlation processing units 2615 to 2618 is different, i.e., connection to a synthesis unit 2914 is different. Next, the synthesis unit 2614 is replaced with the synthesis unit 2914. In the synthesis unit 2914, the subtraction units 343 and 2646 in the synthesis unit 2614 are replaced with addition units 2943 and 2946 and the addition unit 2044 is replaced with a subtraction unit 2947.

(Synthesis Unit)

Figure 30:
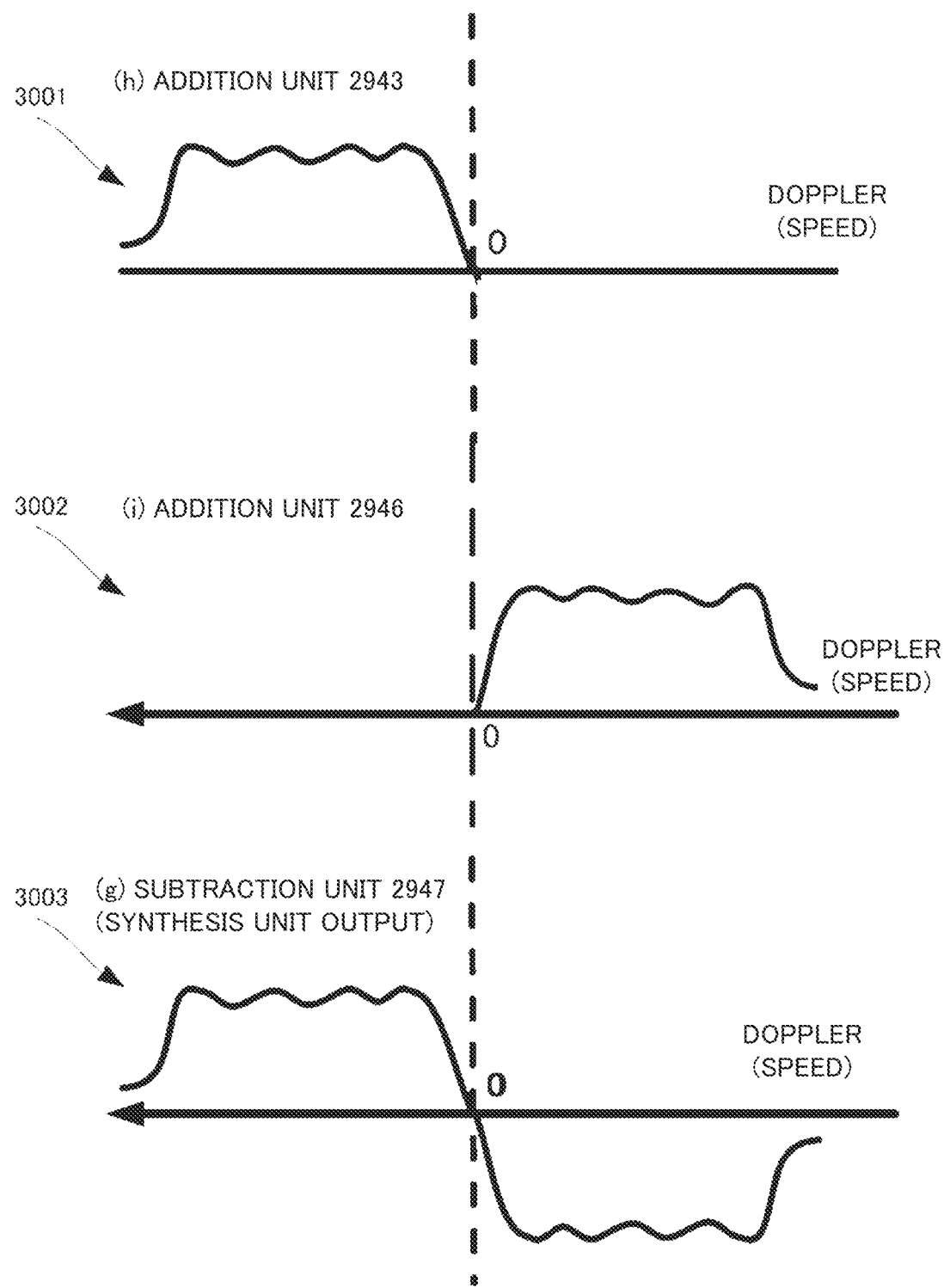
FIG. 30 is a diagram illustrating synthesis processing in which a central portion of an ambiguity function according to the sixth example embodiment of the present invention is viewed as a cross-section.

FIG. 30 is a diagram illustrating synthesis processing of the synthesis unit 2914 in which a central portion of an ambiguity function according to the present example embodiment is viewed as a cross-section. FIG. 30 is a diagram schematically illustrating a cross-section in which (h), (i), and (g) of FIG. 28 are cut along a doppler axis.

In (h) of FIG. 30, a cross ambiguity function 3001 output from the addition unit 2943 is illustrated. In (i) of FIG. 30, a cross ambiguity function 3002 output from the addition unit 2946 is illustrated. In (g) of FIG. 30, a cross ambiguity function 3003 output from the subtraction unit 2947 is illustrated.

According to the present example embodiment, a cross correlation function associated with the cross ambiguity function 3003 produces an advantageous effect of decreasing a sensitivity in a speed zero vicinity and an advantageous effect of causing a sensitivity to be fixed at a speed other than this and discriminating an approaching object from a departing object.

Seventh Example Embodiment

Next, a signal processing device according to a seventh example embodiment of the present invention is described. The signal processing device according to the present example embodiment is different from the fourth example embodiment to the sixth example embodiment in that a maximum value is output from an output unit. Other components and operations are similar to associated components and operations according to the fourth example embodiment to the sixth example embodiment, and therefore the same

Functional Configuration of a Signal Processing Device

Figure 31:
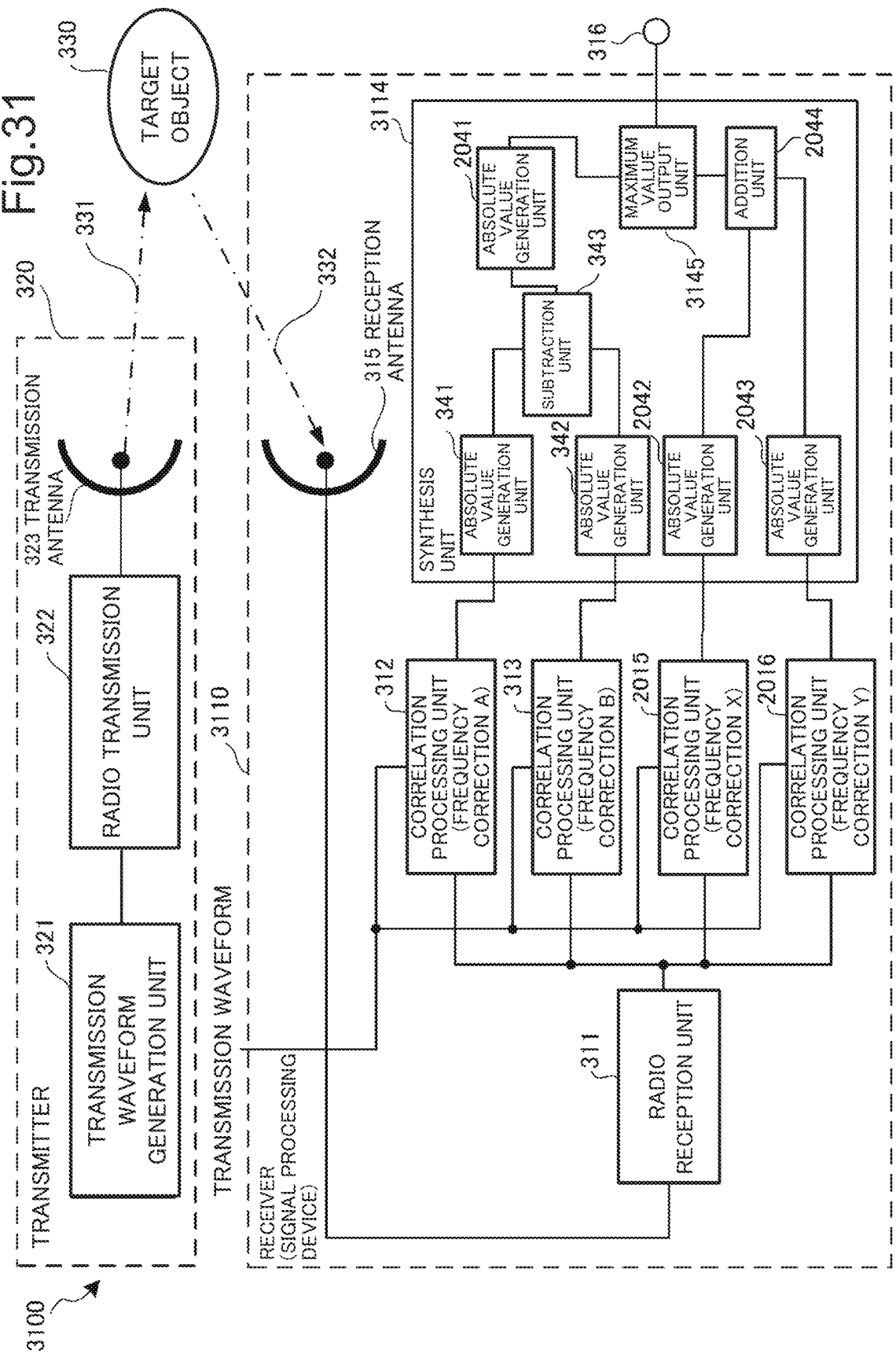
FIG. 31 is a block diagram illustrating a functional configuration of a signal processing device according to a seventh example embodiment of the present invention.

FIG. 31 is a block diagram illustrating a functional configuration of a signal processing device 3110 according to the present example embodiment. In FIG. 31, a functional configuration unit similar to an associated functional configuration unit of FIG. 20 is assigned with the same reference number and overlapping description is omitted.

In the signal processing device 3110 of FIG. 31, a synthesis unit 3114 includes a maximum value output unit 3145, in addition to FIG. 20 of the fourth example embodiment.

(Synthesis Unit)

Figure 32:
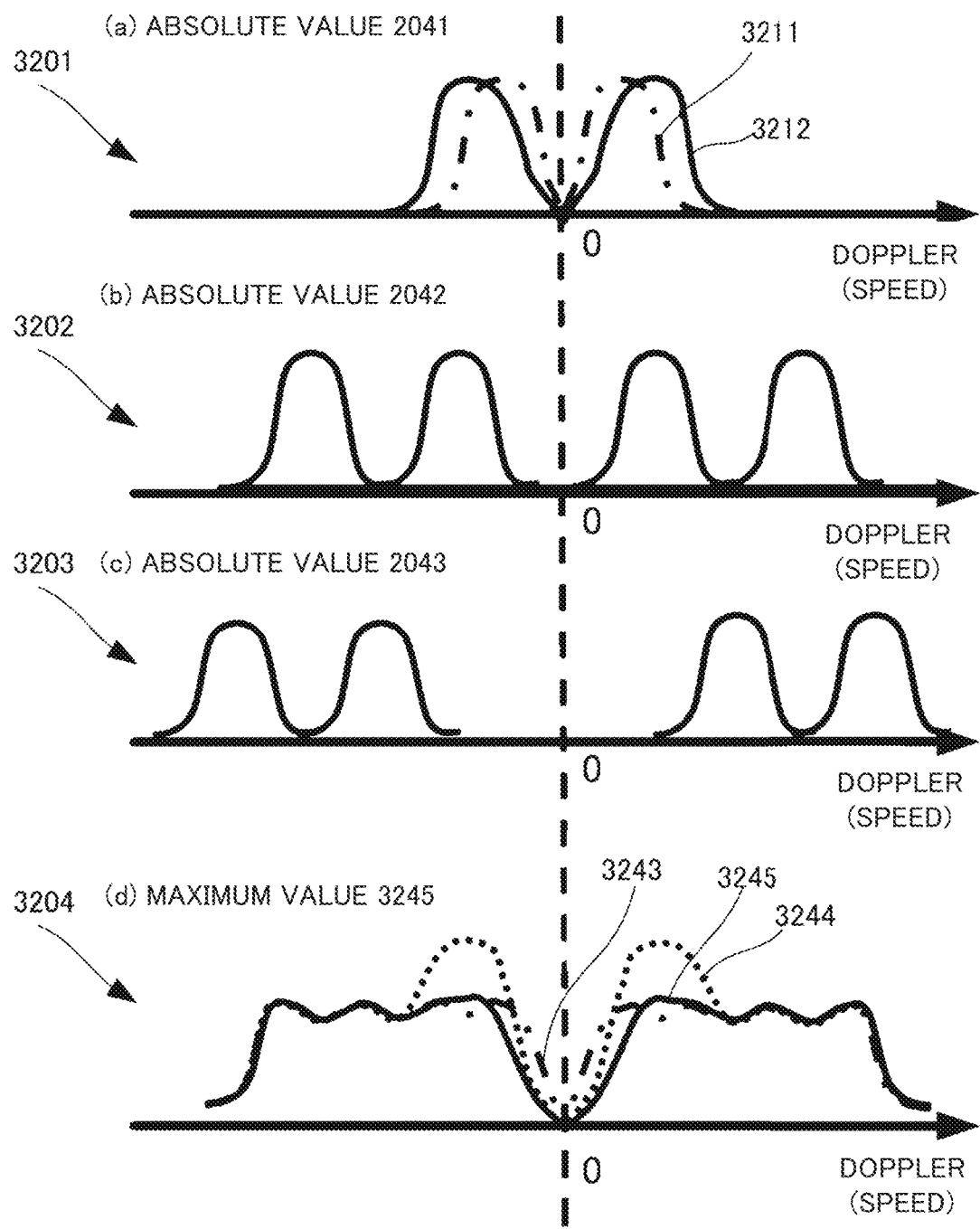
FIG. 32 is a diagram illustrating synthesis processing in which a central portion of an ambiguity function according to the seventh example embodiment of the present invention is viewed as a cross-section.

FIG. 32 is a diagram illustrating synthesis processing of the synthesis unit 3114 in which a central portion of an ambiguity function according to the present example embodiment is viewed as a cross-section.

As illustrated in (a) of FIG. 32, when a sensitivity in a speed zero vicinity is adjusted, a magnitude of a cross ambiguity function 3201 is changed like a solid line 3212 and a dashed-dotted line 3211. When (a) of FIG. 32 is added with a cross ambiguity function acquired by simply adding absolute values of cross ambiguity functions 3202 and 3203 of (b) and (c) of FIG. 32, a sensitivity in a part of a speed other than a speed zero vicinity is largely changed like a dashed-dotted line 3243 and a dotted line 3244 of (d) of FIG. 32. In contrast, when a maximum value is taken, a change of a sensitivity of a speed other than a speed zero vicinity can be decreased like a dashed-dotted line 3243 and a solid line 3245.

According to the present example embodiment, a maximum value is taken instead of simple addition, and thereby it is possible that a sensitivity in a speed zero vicinity is decreased, an object of a speed other than this is detected, and a sensitivity change in a speed zero vicinity is decreased.

Another Example Embodiment

While the invention of the present application has been described with reference to example embodiments thereof, the invention of the present application is not limited to these embodiments. It will be understood by those of ordinary skill in the art that various modifications in configurations and details of the invention of the present application may be made therein without departing from the spirit and scope of the present invention as defined by the claims. A system or device in which separate features included in example embodiments are combined in any optional manner is also included in the scope of the present invention.

The present invention may be applied to a system including a plurality of devices or may be applied to a single device. The present invention can be applied when an information processing program for achieving a function of an example embodiment is supplied directly or remotely to a system or a device. Therefore, in order to achieve a function of the present invention by using a computer, a program installed in a computer, a medium storing the program, or a world wide web (WWW) server for downloading the program is also included in the scope of the present invention. In particular, at least a non-transitory computer readable medium storing a program that causes a computer to execute processing steps included in the example embodiments described above is included in the scope of the present invention.

Other Expressions of Example Embodiments

A part or the whole of the example embodiments described above can be described as, but not limited to, the following supplementary notes.

[Supplementary Note 1]

A signal processing device, including:

at least two cross correlation calculation means that each calculate a cross correlation function between a waveform of a reflection signal acquired when a transmission signal having changing frequencies is reflected by a target object, and a different correlation waveform generated from a waveform of the transmission signal; and a synthesis means that synthesizes at least two cross correlation functions acquired from the at least two cross correlation calculation means in such a way that it is difficult to detect a target object in a predetermined speed range, and outputs a synthesis result to a post-processing unit.

[Supplementary Note 2]

The signal processing device according to supplementary note 1, wherein the synthesis means includes a means that executes subtraction between absolute values of the at least two cross correlation functions.

[Supplementary Note 3]

The signal processing device according to supplementary note 1 or 2, wherein the predetermined speed range is a range including a speed of zero.

[Supplementary Note 4]

The signal processing device according to any one of supplementary notes 1 to 3, wherein the post-processing includes at least any one of position detection and speed detection of the target object except a target object in the predetermined speed range.

[Supplementary Note 5]

The signal processing device according to any one of supplementary notes 1 to 4, wherein the at least two cross correlation calculation means each use, as the different correlation waveform, a waveform in which a cross ambiguity function between a waveform of the transmission signal and a waveform subjected to a frequency correction is symmetrical with respect to a doppler direction and a gap is generated in a cross ambiguity function synthesized by the synthesis means.

[Supplementary Note 6]

The signal processing device according to any one of supplementary notes 1 to 5, wherein the at least two cross correlation calculation means each further use, as the different correlation waveform, a waveform acquired by adding a waveform subjected to a different frequency correction to a waveform of the transmission signal or a waveform acquired by adding a waveform subjected to a different expansion/contraction on a time axis to a waveform of the transmission signal.

[Supplementary Note 7]

The signal processing device according to supplementary notes 1 to 6, wherein the transmission signal is a waveform in which a value of a self-ambiguity function is large in a vicinity of a delay time of zero and a frequency shift of zero and includes a waveform in which a sinusoidal wave based on frequency modulation of a sinusoidal frequency modulation (SFM) waveform is modulated.

[Supplementary Note 8]

The signal processing device according to any one of supplementary notes 1 to 6, wherein the transmission signal includes a waveform in which a frequency bandwidth is modulated in such a way that a frequency increases/decreases in a curved manner and a frequency bandwidth temporally increases/decreases in a curved manner.

[Supplementary Note 9]

The signal processing device according to any one of supplementary notes 1 to 6, wherein the transmission signal is a waveform acquired by overlapping a first waveform in which a frequency increases/decreases in a curved manner and a frequency bandwidth temporally increases/decreases in a curved manner, and a second waveform in which an increase/decrease of a frequency is symmetrical with respect to a time direction or a frequency direction.

[Supplementary Note 10]

A signal processing method, including:

at least two cross correlation calculation steps of each calculating a cross correlation function between a waveform of a reflection signal acquired when a transmission signal having changing frequencies is reflected by a target object, and a different correlation waveform generated from a waveform of the transmission signal;

a synthesis step of synthesizing at least two cross correlation functions acquired from the at least two cross correlation calculation means in such a way that it is difficult to detect a target object in a predetermined speed range, and outputting a synthesis result to a post-processing unit; and a synthesis step of synthesizing at least two cross correlation functions acquired from the at least two cross correlation calculation means in such a way that it is difficult to detect a target object in a predetermined speed range.

[Supplementary Note 11]

A signal processing program that causes a computer to execute:

at least two cross correlation calculation steps of each calculating a cross correlation function between a waveform of a reflection signal acquired when a transmission signal having changing frequencies is reflected by a target object and a different correlation waveform generated from a waveform of the transmission signal; and a synthesis step of synthesizing at least two cross correlation functions acquired from the at least two cross correlation calculation means in such a way that it is difficult to detect a target object in a predetermined speed range, and outputting a synthesis result to a post-processing unit.

This application is based upon and claims the benefit of priority from Japanese patent application No. 2017-068243, filed on Mar. 30, 2017, the disclosure of which is incorporated herein in its entirety by reference.

What is claimed is:

1. A signal processing device, comprising:
at least two cross correlation calculation units each calculating a cross correlation function between a waveform of a reflection signal acquired when a transmission signal having changing frequencies is reflected by a target object, and a different correlation waveform generated from a waveform of the transmission signal; and
a synthesis unit synthesizing at least two cross correlation functions acquired from the at least two cross correlation calculation units in such a way that it is difficult to detect a target object in a predetermined speed range, and outputting a synthesis result to a post-processing unit.

2. The signal processing device according to claim 1, wherein the synthesis unit includes unit executing subtraction between absolute values of the at least two cross correlation functions.

3. The signal processing device according to claim 1, wherein the predetermined speed range is a range including a speed of zero.

4. The signal processing device according to claim 1, wherein the post-processing includes at least any one of position detection and speed detection of the target object except a target object in the predetermined speed range.

5. The signal processing device according to claim 1, wherein the at least two cross correlation calculation units each use, as the different correlation waveform, a waveform in which a cross ambiguity function between a waveform of the transmission signal and a waveform subjected to a frequency correction is symmetrical with respect to a doppler direction and a gap is generated in a cross ambiguity function synthesized by the synthesis unit.

6. The signal processing device according to claim 1, wherein the at least two cross correlation calculation units each further use, as the different correlation waveform, a waveform acquired by adding a waveform subjected to a different frequency correction to a waveform of the transmission signal or a waveform acquired by adding a waveform subjected to a different expansion/contraction on a time axis to a waveform of the transmission signal.

7. The signal processing device according to claim 1, wherein the transmission signal is a waveform in which a value of a self-ambiguity function is large in a vicinity of a delay time of zero and a frequency shift of zero and includes a waveform in which a sinusoidal wave based on frequency modulation of a sinusoidal frequency modulation (SFM) waveform is modulated.

8. The signal processing device according to claim 1, wherein the transmission signal includes a waveform in which a frequency bandwidth is modulated in such a way that a frequency increases/decreases in a curved manner and a frequency bandwidth temporally increases/decreases in a curved manner.

9. The signal processing device according to claim 1, wherein the transmission signal is a waveform acquired by overlapping a first waveform in which a frequency increases/decreases in a curved manner and a frequency bandwidth temporally increases/decreases in a curved manner, and a second waveform in which an increase/decrease of a frequency is symmetrical with respect to a time direction or a frequency direction.

10. A signal processing method, comprising:
calculating at least two cross correlation functions each between a waveform of a reflection signal acquired when a transmission signal having changing frequencies is reflected by a target object, and a different correlation waveform generated from a waveform of the transmission signal;
synthesizing the calculated at least two cross correlation functions in such a way that it is difficult to detect a target object in a predetermined speed range, and outputting a synthesis result to a post-processing unit.

11. A non-transitory computer-readable medium storing a signal processing program that causes a computer to execute:
calculating at least two cross correlation functions each between a waveform of a reflection signal acquired when a transmission signal having changing frequencies is reflected by a target object, and a different correlation waveform generated from a waveform of the transmission signal; and
synthesizing the calculated at least two cross correlation functions in such a way that it is difficult to detect a target object in a predetermined speed range, and outputting a synthesis result to a post-processing unit.

* * * * *